United States Patent
Brom et al.

(10) Patent No.: US 12,139,287 B2
(45) Date of Patent: Nov. 12, 2024

(54) SYSTEM COMPRISING CONTAINMENT EQUIPMENT FOR THE ASEPTIC TRANSFER OF A POWDER

(71) Applicant: Skan AG, Allschwil (CH)

(72) Inventors: Vincent Brom, Buschwiller (FR); Frank Martin Lehmann, Binningen (CH)

(73) Assignee: Skan AG, Allschwil (CH)

( * ) Notice: Subject to any disclaimer, the term of this patent is extended or adjusted under 35 U.S.C. 154(b) by 245 days.

(21) Appl. No.: 17/640,304

(22) PCT Filed: Aug. 12, 2020

(86) PCT No.: PCT/CH2020/000010
§ 371 (c)(1),
(2) Date: Jul. 20, 2022

(87) PCT Pub. No.: WO2021/042217
PCT Pub. Date: Mar. 11, 2021

(65) Prior Publication Data
US 2022/0388702 A1    Dec. 8, 2022

(30) Foreign Application Priority Data
Sep. 5, 2019  (EP) .................................. 19405014

(51) Int. Cl.
*B65B 1/04* (2006.01)
*B25J 15/00* (2006.01)
(Continued)

(52) U.S. Cl.
CPC ......... *B65B 55/027* (2013.01); *B25J 15/0028* (2013.01); *B25J 15/0433* (2013.01);
(Continued)

(58) Field of Classification Search
CPC ............. B65B 1/04; B65B 1/36; B65B 7/168; B65B 7/28; B65B 7/2821; B65B 7/2842;
(Continued)

(56) References Cited

U.S. PATENT DOCUMENTS 6,749,808 B1 * 6/2004 Huynen et al. ....... B65B 55/027
  53/425
8,820,365 B2 * 9/2014 Aguerre et al. ....... B65B 3/003
  141/2
(Continued)

FOREIGN PATENT DOCUMENTS

EP  3281877 A1  2/2018
EP  3335844 A1  6/2018
(Continued)

OTHER PUBLICATIONS

"Fully Automated Aseptic Handling & Filing of Bulk API Powder in Isolator Technology," Screenshots obtained from <https://www.youtube.com/watch?v=mwaLyBz8pMk>, dated Jun. 8, 2018 (28 pages).
(Continued)

*Primary Examiner* — Stephen F. Gerrity
(74) *Attorney, Agent, or Firm* — McCarter & English, LLP

(57) ABSTRACT

The system comprising containment equipment is intended for the aseptic transfer of a powder, namely for emptying a container filled with powder into a collection container and/or for filling a container with powder from a storage container. The containment equipment has a working chamber surrounded by a housing. A robot is installed in the containment equipment, having an arm arrangement that moves over a pivot range. If there is a collection container it has an inlet leading from the working chamber, and if there is a storage container it has an outlet leading off into the working chamber. The container can be closed at least with
(Continued)

Figure 1:
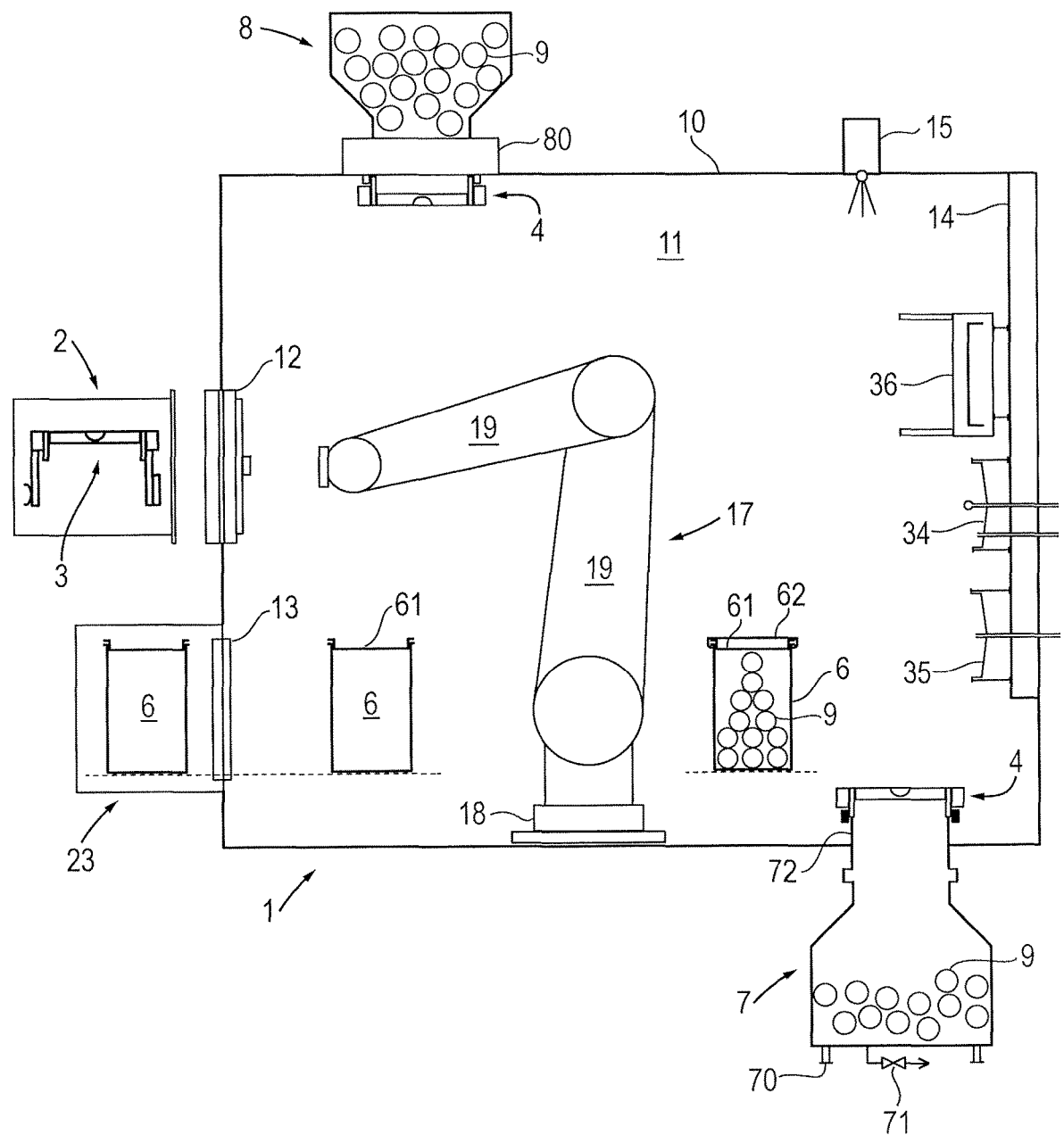

a first closure element. A transfer head is mounted at the inlet into the collection container and/or at the outlet of the storage container, each protruding into the working chamber. The passive part forms the double flap together with an active part contained in the transfer head.

17 Claims, 24 Drawing Sheets

(51) Int. Cl.
    *B25J 15/04*     (2006.01)
    *B25J 21/00*     (2006.01)
    *B65B 1/36*     (2006.01)
    *B65B 7/16*     (2006.01)
    *B65B 7/28*     (2006.01)
    *B65B 31/02*     (2006.01)
    *B65B 43/46*     (2006.01)
    *B65B 55/02*     (2006.01)
    *B65B 55/24*     (2006.01)
    *B65B 69/00*     (2006.01)

(52) U.S. Cl.
    CPC .......... *B25J 15/0491* (2013.01); *B25J 21/005* (2013.01); *B65B 1/04* (2013.01); *B65B 1/36* (2013.01); *B65B 7/168* (2013.01); *B65B 7/28* (2013.01); *B65B 7/2821* (2013.01); *B65B 7/2842* (2013.01); *B65B 31/02* (2013.01); *B65B 43/46* (2013.01); *B65B 69/00* (2013.01); *B65B 55/24* (2013.01); *B65B 2210/06* (2013.01)

(58) Field of Classification Search
    CPC ....... B65B 31/02; B65B 39/003; B65B 43/46; B65B 55/027; B65B 55/24; B65B 69/00; B65B 2210/06; B25J 15/0491; B25J 21/005
    See application file for complete search history.

(56) References Cited

U.S. PATENT DOCUMENTS

| | | | |
|---|---|---|---|
| 2004/0185521 A1* | 9/2004 | Yoshida et al. | ........ B25J 21/005 435/287.9 |
| 2009/0120041 A1* | 5/2009 | Trebbi et al. | .......... B65B 69/00 53/459 |
| 2016/0050946 A1* | 2/2016 | Childs | .................... B65B 31/02 99/451 |
| 2016/0272347 A1 | 9/2016 | Procyshyn et al. | |
| 2018/0282681 A1* | 10/2018 | Koike et al. | .......... B25J 21/005 |
| 2019/0077526 A1* | 3/2019 | Este et al. | ............... B65B 3/003 |

FOREIGN PATENT DOCUMENTS

| | | |
|---|---|---|
| EP | 3789305 B1 | 1/2022 |
| WO | 2019071339 A1 | 4/2019 |

OTHER PUBLICATIONS

"Aseptic Handling and Filing of Bulk API Powder in Pharma," Screenshots obtained from https://www.youtube.com/watch?v=ch8wiUysUZY, dated Oct. 25, 2017 (23 pages).

International Search Report of the International Searching Authority, along with an English translation, mailed on Oct. 28, 2020, issued in connection with International Application No. PCT/CH20/000010 (5 pages).

Written Opinionn of the International Searching Authority, mailed on Oct. 28, 2020, issued in connection with International Application No. PCT/CH20/000010 (5 pages).

* cited by examiner

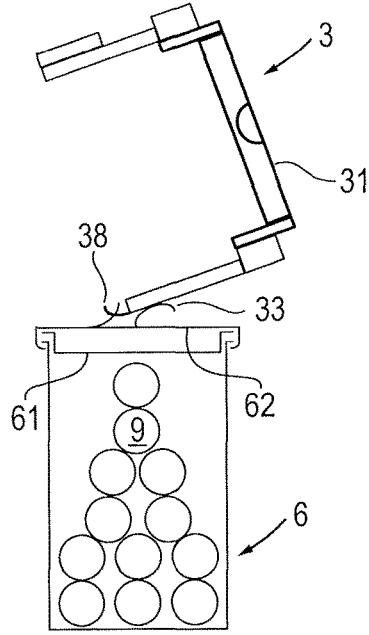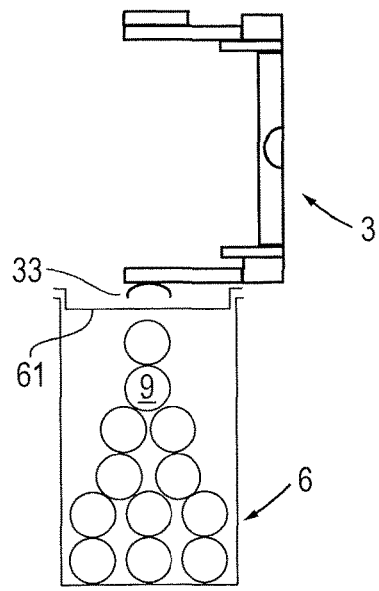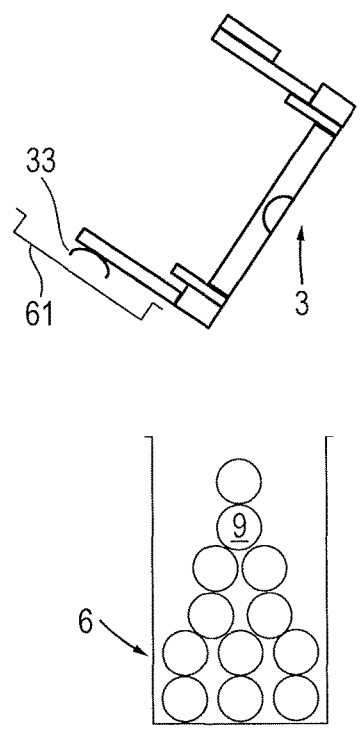
Fig. 6A  Fig. 6B  Fig. 6C
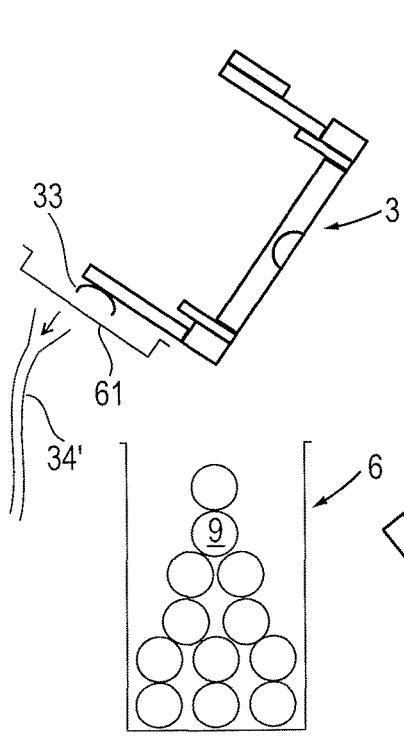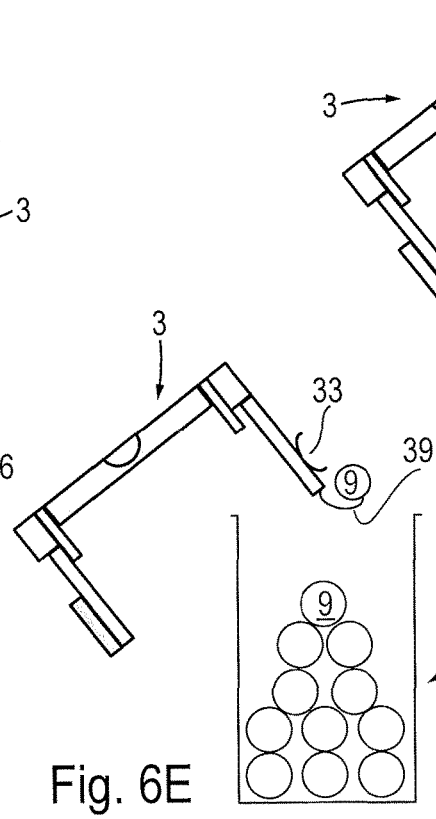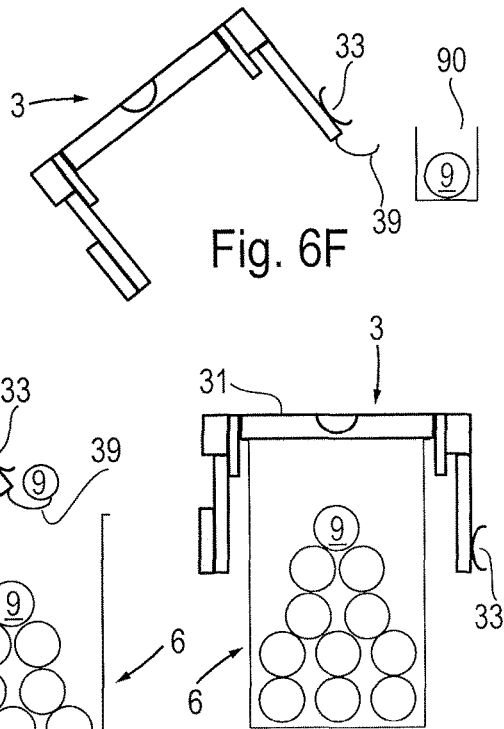
Fig. 6D  Fig. 6E  Fig. 6G

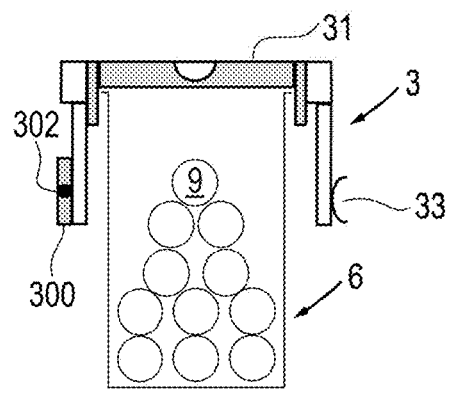
Fig. 6H
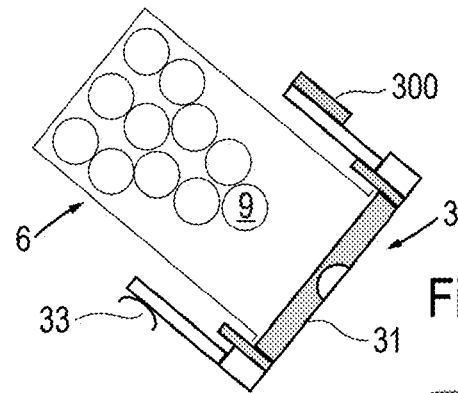
Fig. 6I
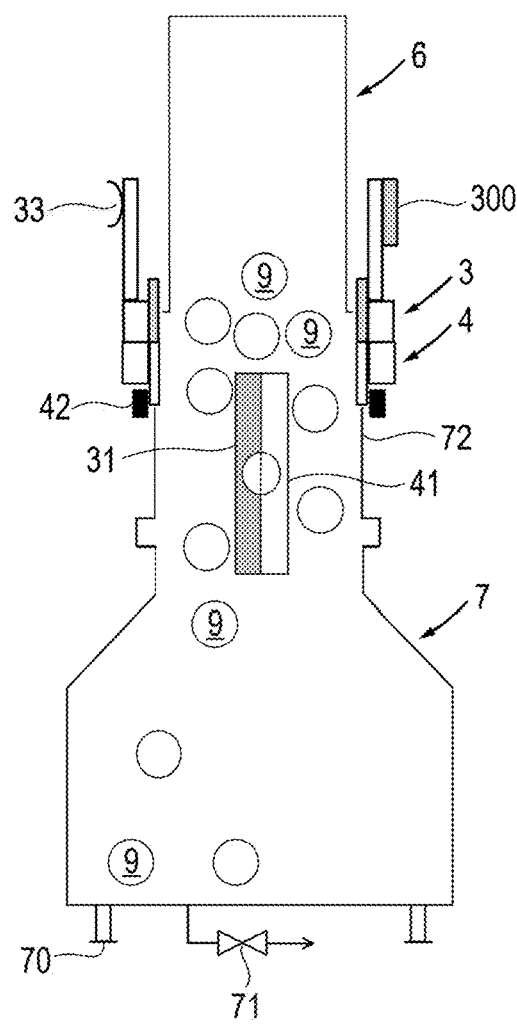
Fig. 6J
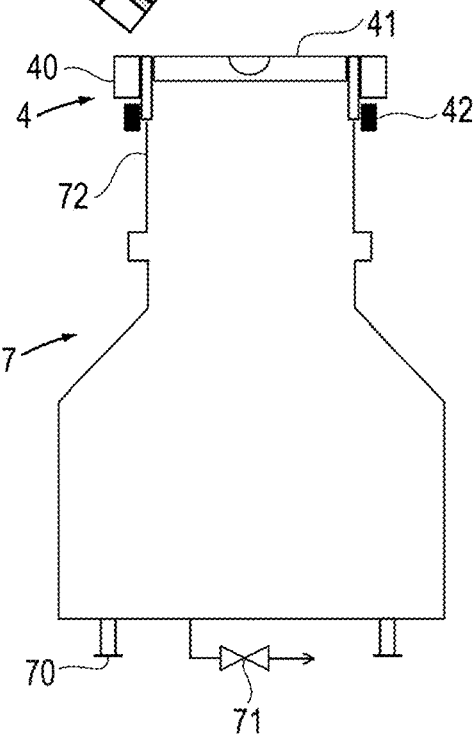

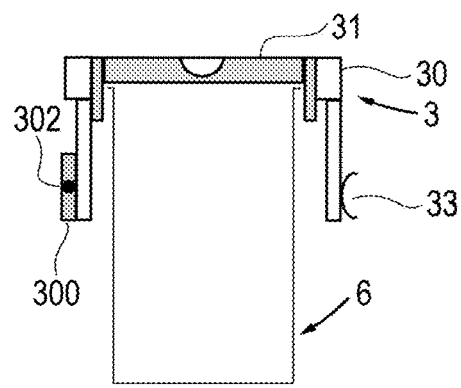
Fig. 6M
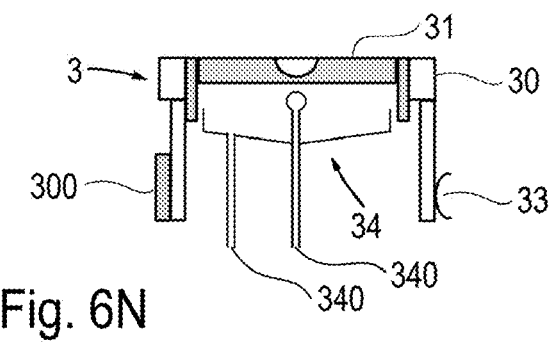
Fig. 6N
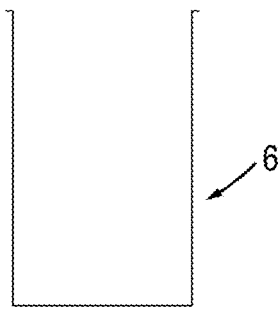
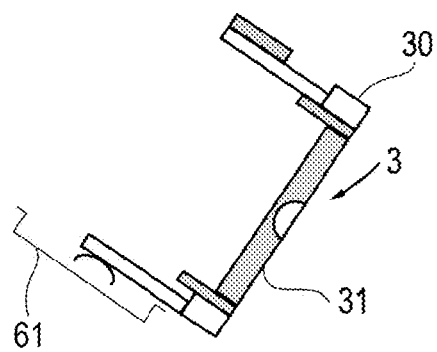
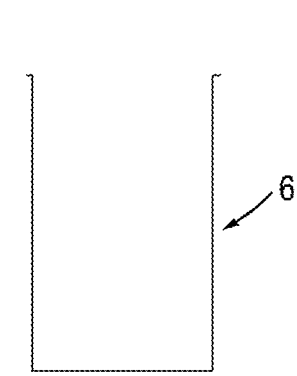
Fig. 6O    Fig. 6P    Fig. 6Q

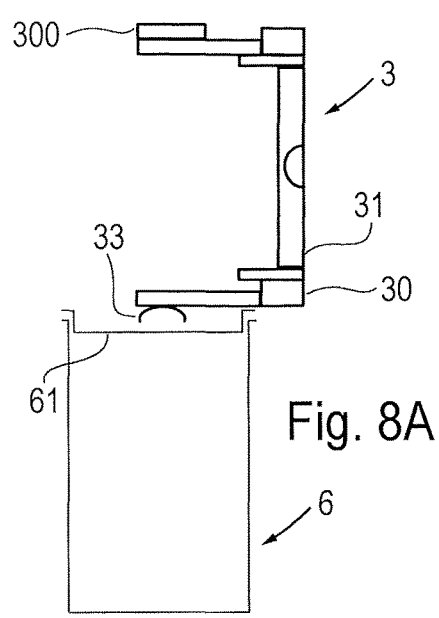
Fig. 8A
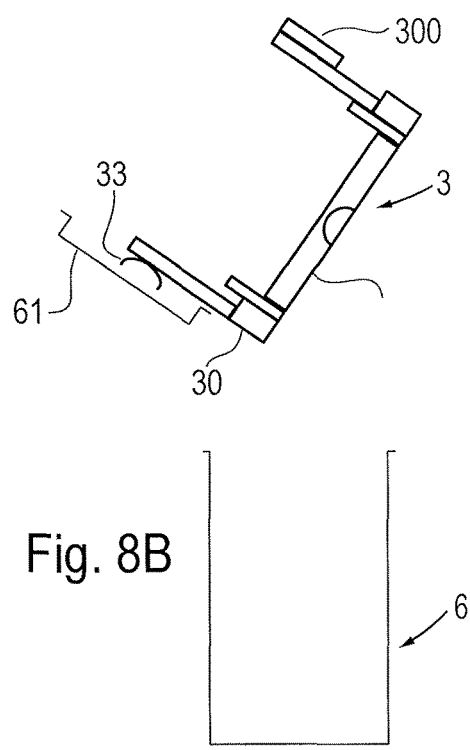
Fig. 8B
Fig. 8C
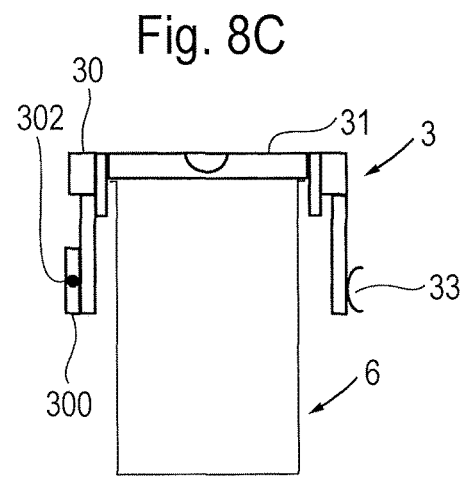
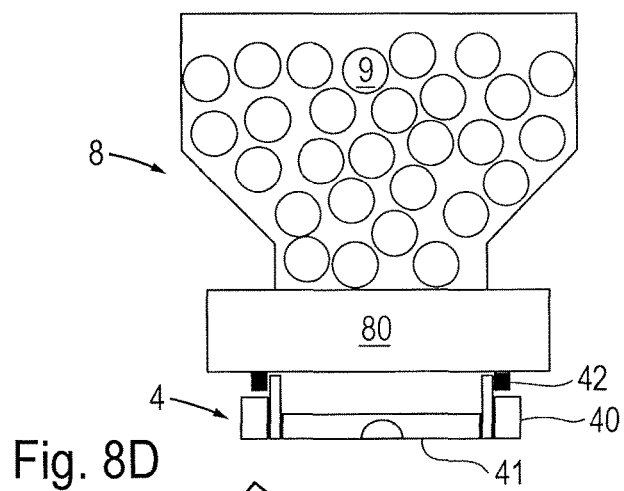
Fig. 8D
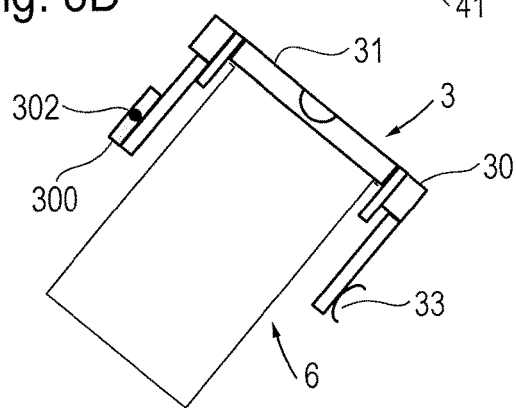

Fig. 10A
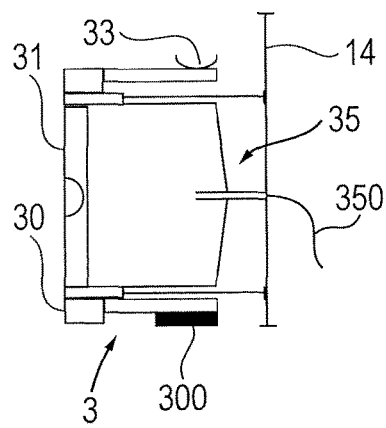
Fig. 10B
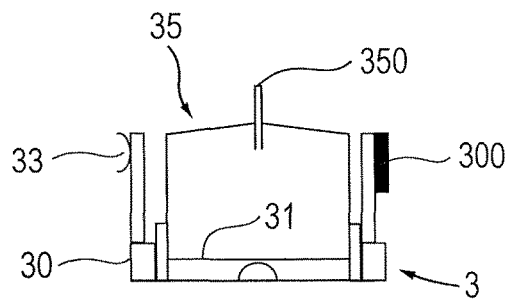
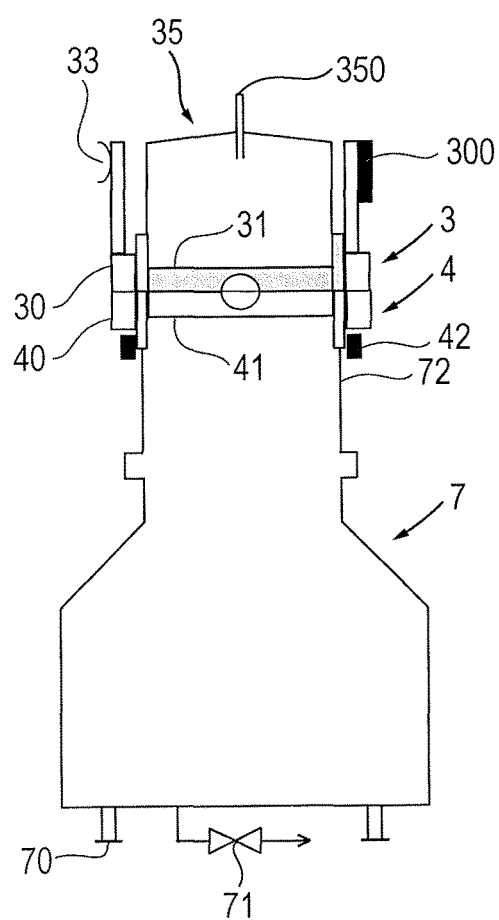
Fig. 10C

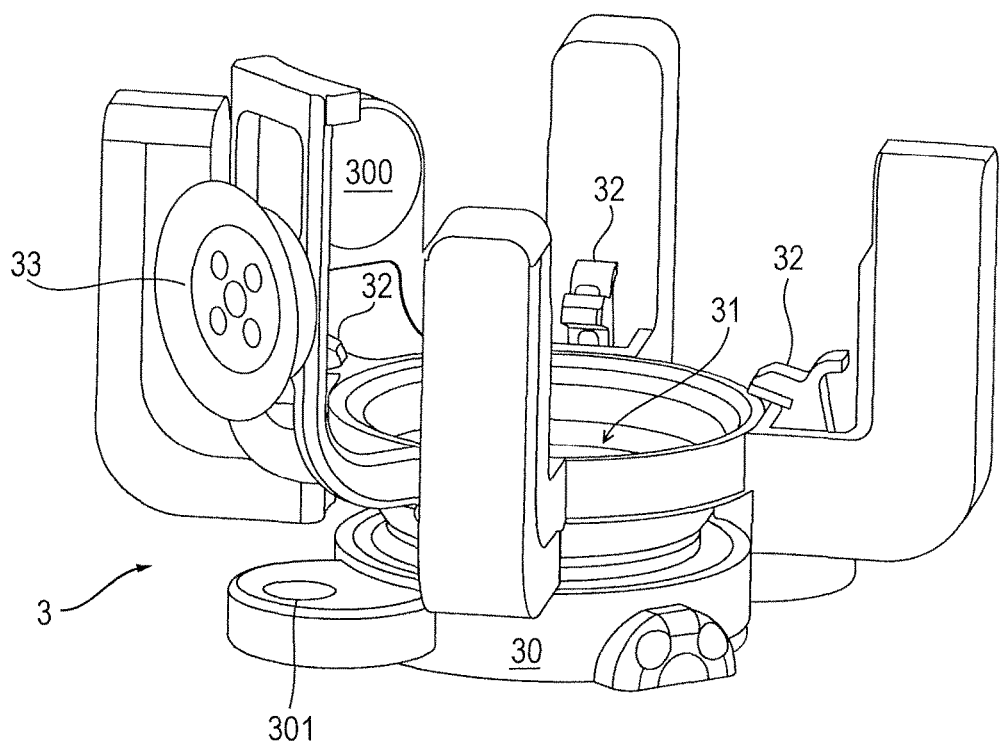
Fig. 12A
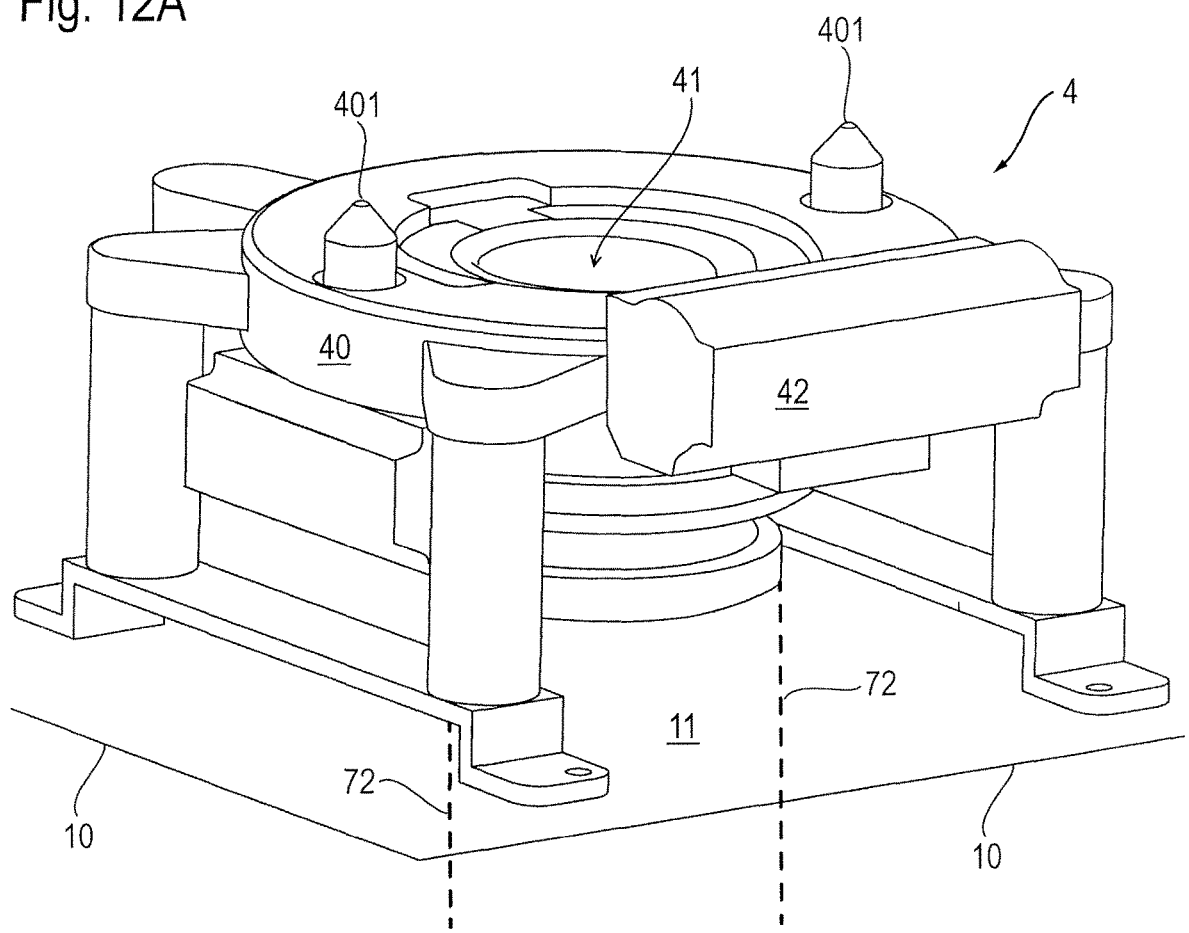

SYSTEM COMPRISING CONTAINMENT EQUIPMENT FOR THE ASEPTIC TRANSFER OF A POWDER

RELATED APPLICATIONS

This application is a U.S. National Phase Application under 35 U.S.C. 371 of International Application No. PCT/CH2020/000010 filed Aug. 12, 2020, which claims the benefit of European Patent Application No. 19405014.2 filed on Sep. 5, 2019. The disclosures of these applications are expressly incorporated herein by reference in their entireties.

FIELD OF THE INVENTION

The present invention relates to an installation comprising a containment for the aseptic transfer of a powder, namely designed for emptying a container filled with powder into a collection container and/or for filling a container with powder from a storage container. The containment has a working chamber surrounded by a housing. Installed in the containment there is a robot, which has an arm arrangement that is movable over a swivel range. If there is a collection container present it has an inlet that leads in out of the working chamber, and if there is a storage container present it has an outlet that leads off into the working chamber. The container can be closed at least by means of a first closure element. The installation is particularly advantageous for emptying and/or filling a relatively large number of containers.

PRIOR ART

The company Comecer Netherlands, in NL-8500 AC Joure, offers an installation comprising a containment for the aseptic transfer of a powder, in particular pharmaceutical products filled in cans. Installed in the installation is a plurality of robots, and tool changes are necessary for the different work steps (see www.youtube.com/watch?v=ch8wiUysUZY; and www.youtube.com/watch?v=mwaLyBz8pMk; internet excerpts from May 9, 2019).

OBJECT OF THE INVENTION

Proceeding from the already known prior art, the invention is based on the object of proposing a more advanced installation comprising a containment for the aseptic transfer of a powder in order to increase the production efficiency with the least possible requirement for equipment and space. The installation in this case is to be designed in such a way that the emptying or filling of a relatively large number of containers can be realized as a production line and, at the same time, the installation can be used also or exclusively for taking samples of the handled powder for checking purposes under protected conditions.

OVERVIEW OF THE INVENTION

The installation according to the invention comprising a containment is designed for the aseptic transfer of a powder, namely for emptying a container filled with powder into a collection container and/or for filling a container with powder from a storage container. The containment has a working chamber surrounded by a housing. Installed in the containment there is a robot, which has an arm arrangement that is movable over a swivel range. If there is a collection container present it has an inlet that leads in out of the working chamber, and if there is a storage container present it has an outlet that leads off into the working chamber. The container can be closed at least by means of a first closure element. The arm arrangement is connected to a tool carrier, which is equipped at its base with at least clamping elements for gripping the container, a vacuum lifter for gripping the first closure element, and a passive part of a double flap. Mounted at the inlet into the collection container and/or at the outlet of the storage container there is a transfer head, each of which projects into the working chamber. The passive part, together with an active part contained in the transfer head, forms the double flap.

Particular embodiments of the invention are defined in the following: The base of the tool carrier has a connecting flange for connection to the arm arrangement, wherein a load cell can be seated in the connecting flange. The base has positioning members, which are designed for positive and force-fitting connection to complementary locking members located on a base of the transfer head and which ensure pressure-tight assembly between the tool carrier and the transfer head.

The base of the tool carrier is equipped to temporarily receive a suction tool or a rinsing and sterilization tool or a flanging tool. The clamping elements are used alone or additionally to fix these tools to the base of the tool carrier. The suction tool is used inside the working chamber to clean the tool carrier and first closure elements. The rinsing and sterilization tool is used inside the working chamber to clean and sterilize the collection container, including the passive part and the active part of the double flap. The flanging tool is used inside the working chamber to apply a second closure element to the container. These tools are detachably deposited, inside the working chamber, at a parking station to be used for access with the tool carrier installed on the arm arrangement of the robot.

The tool carrier, when fully equipped, also comprises:
  a vibrator for detaching a residue of powder from a container to be emptied;
  a severing hook for removing any possible second closure element present on a container to be emptied; and
  a sampling tool for taking a sample from the powder for checking purposes.

The first closure element is realized as a lid placed on the mouth of the container or as a plug inserted into the mouth of the container. The second closure element is realized as a flanged cap attached to the container over the first closure element.

For the purpose of introducing the tool carrier into the working chamber in a sterile condition, a hermetically encased transfer container is provided, and the housing has a transfer port. The transfer container is designed to receive the tool carrier and to dock onto the transfer port. When the transfer container has been docked onto the transfer port, with the transfer port and transfer container open, the tool carrier can be pulled out of the transfer container and into the working chamber by the accessing robot.

For the purpose of introducing into the working chamber, in a decontaminated condition, containers that are to be emptied or filled, a hermetically encased lock is provided, and the housing has a lock port. The lock is designed to receive containers and to dock onto the lock port. When the lock has been docked onto the lock port, with the lock port and lock open, the containers can be pulled out of the lock and into the working chamber by the accessing robot or can enter the working chamber by means of a conveyor.

The load cell seated in the connecting flange is used for comparative weight determination, namely:

in the process of emptying a container filled with powder into the collection container, between the container that, in the initial situation, is filled with powder and the emptied container; or in the process of filling an empty container with powder from the storage container, between the container that, in the initial situation, is empty and the container filled with powder.

The sampling tool provided for taking a sample of powder for checking purposes is used in the process of emptying a container filled with powder into the collection container or in the process of filling an empty container with powder from the storage container. Alternatively, the installation is used exclusively for checking the characteristics of the handled powder by use of the sampling tool.

The lock can also be used for removing empty or filled containers from the working chamber, and also for introducing and removing containers filled with powder into and from the working chamber for the purpose of taking a sample quantity, by means of the sampling tool, for checking the characteristics of the powder handled. Or provided on the containment there is a second lock or a mousehole for removing empty or filled containers from the working chamber, and also for introducing and removing containers filled with powder into and from the working chamber for the purpose of taking a test quantity, by means of the sampling tool, for checking the characteristics of the powder handled.

For the process of filling an empty container with powder from the storage container, there is a dosing device, arranged between the storage container and the transfer head, for apportioning the required filling quantity of powder.

The transfer head belonging to the collection container is anchored to the housing of the containment, preferably to a floor element, and a channel piece extends from the transfer head to the collection container. The transfer head belonging to the storage container is anchored to the housing of the containment, preferably to a ceiling element.

BRIEF DESCRIPTION OF THE ACCOMPANYING DRAWINGS

Figure 2:
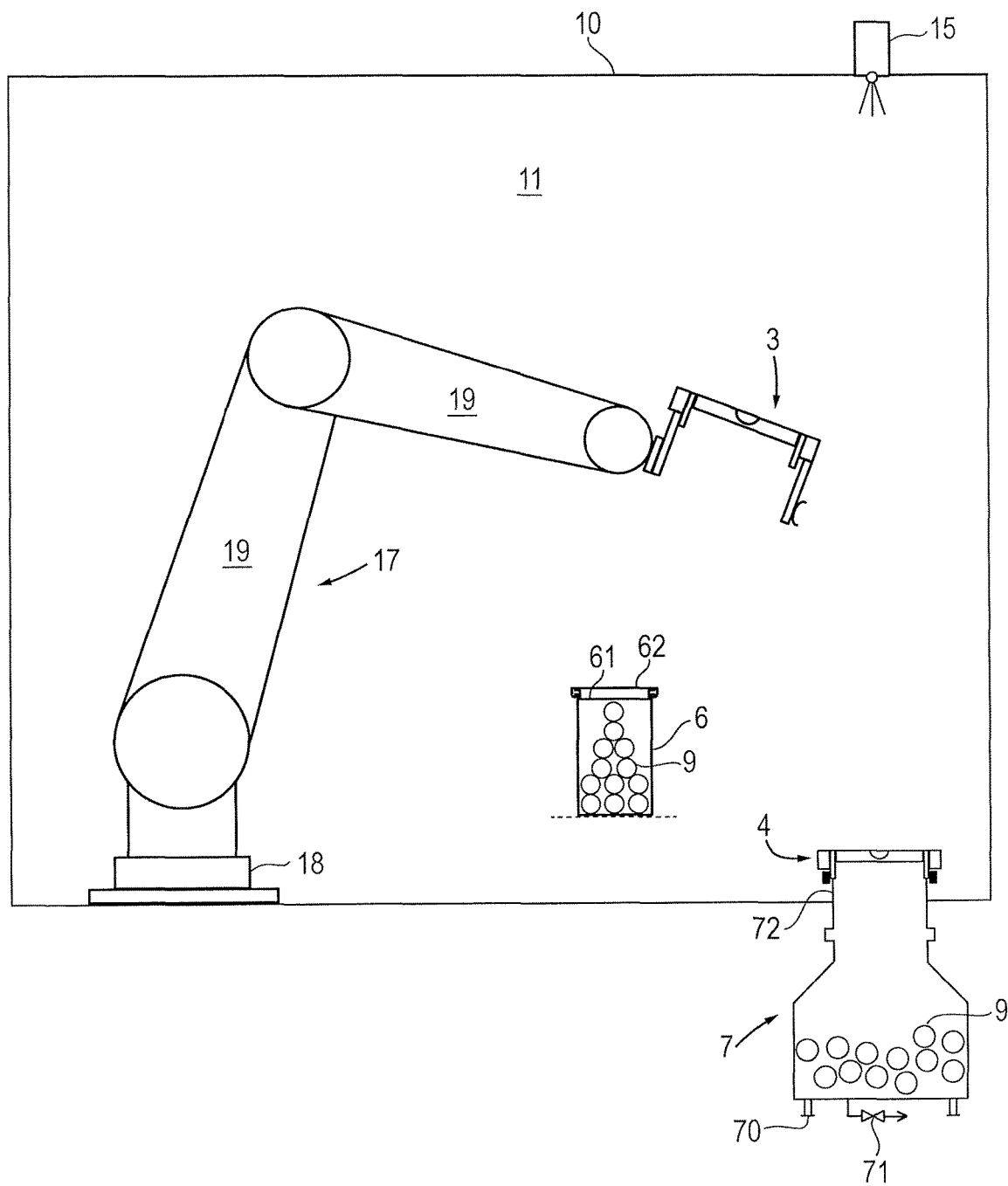
Figure 3A:
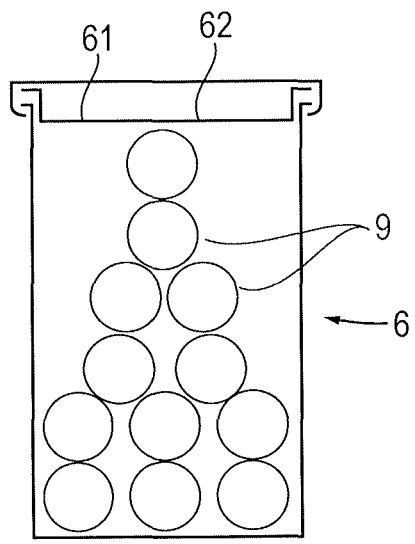
Figure 3B:
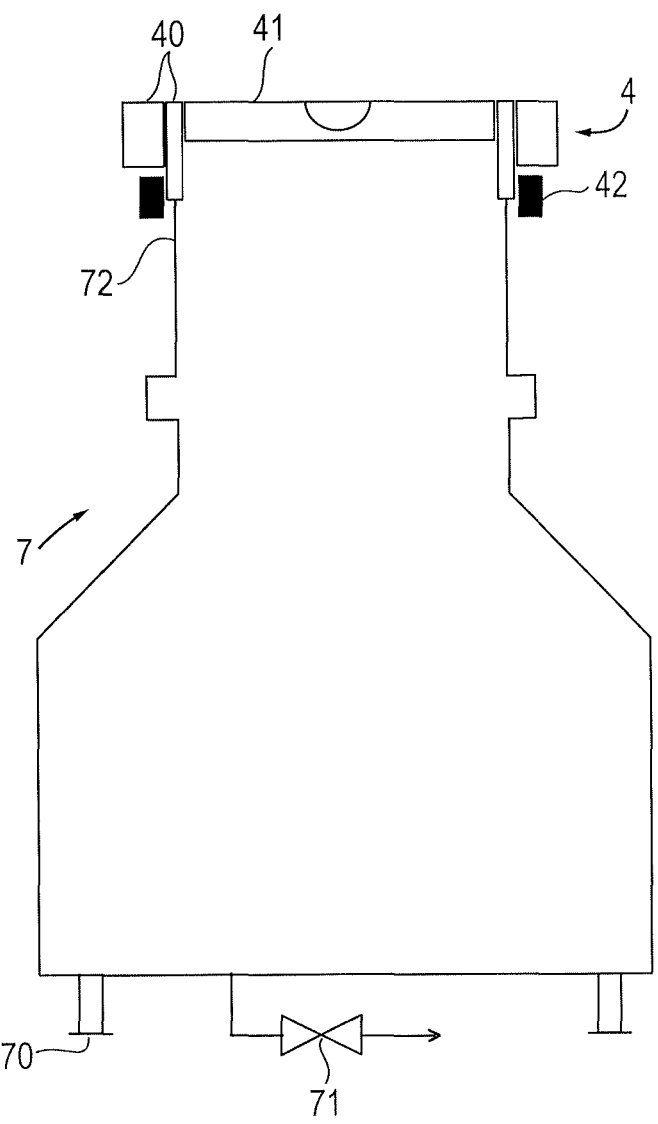
Figure 4A:
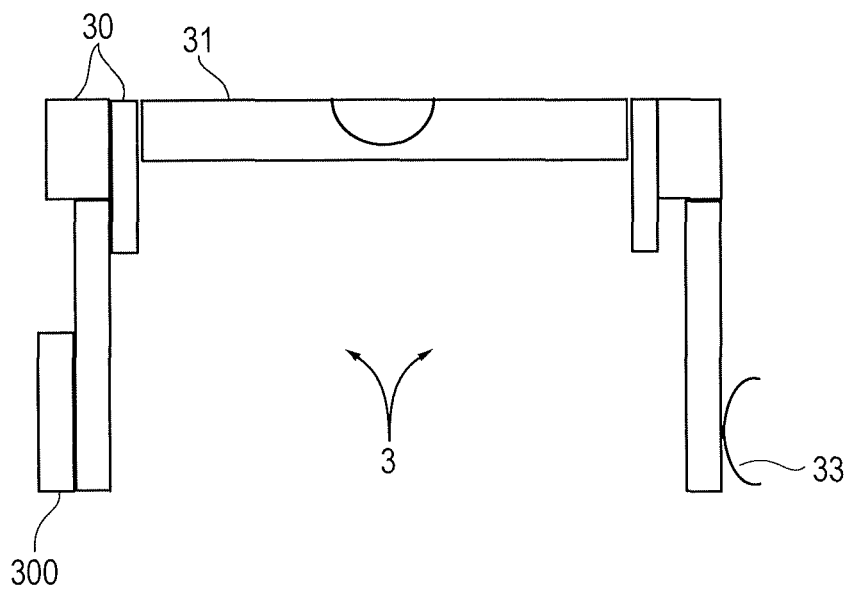
Figure 4B:
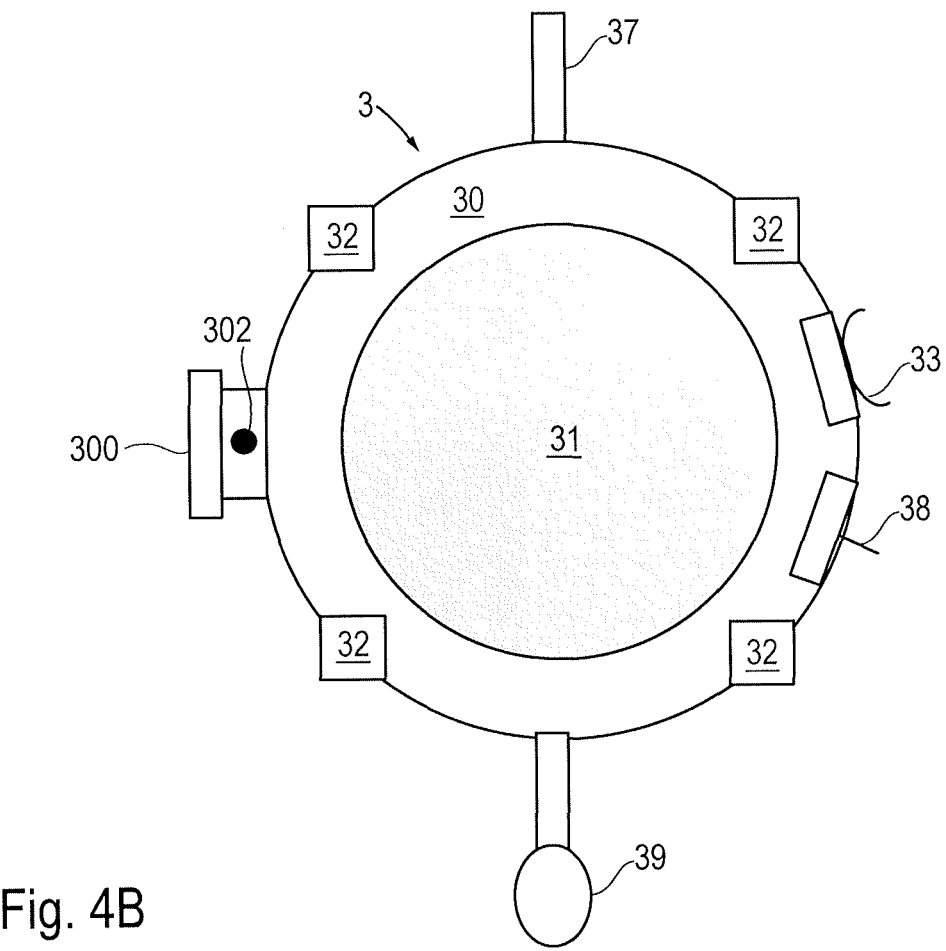
Figure 4C:
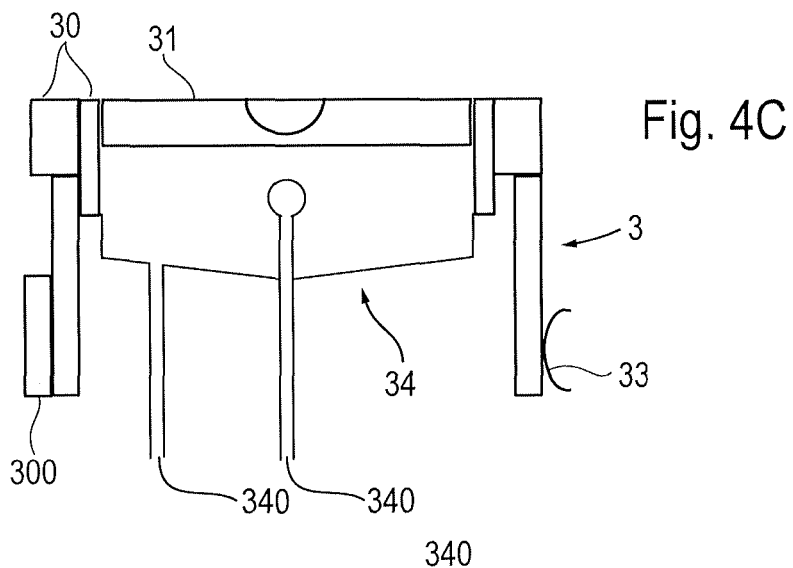
Figure 4D:
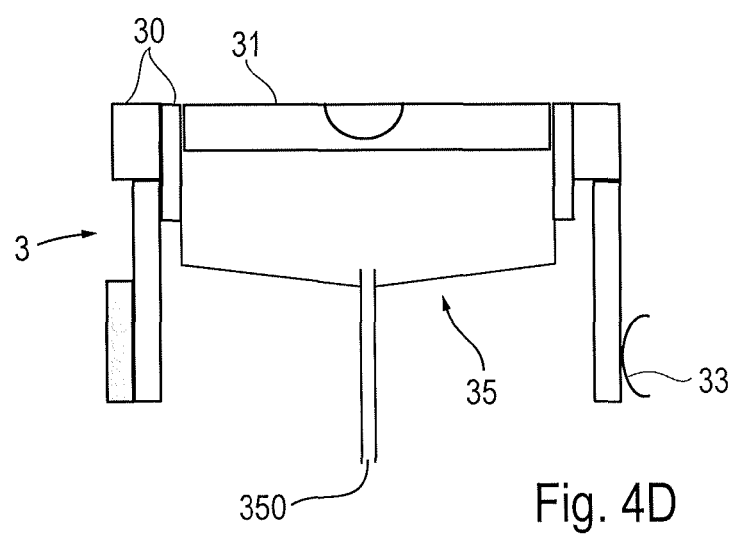
Figure 4E:
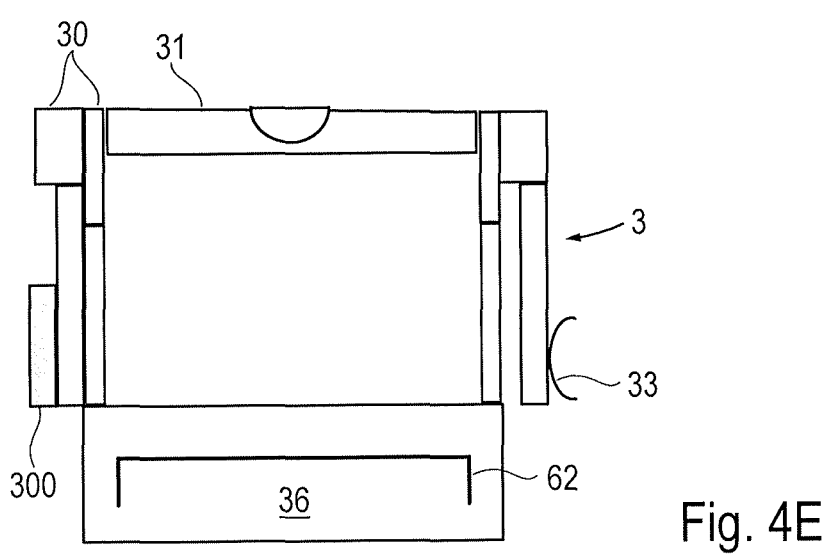
Figure 5A:
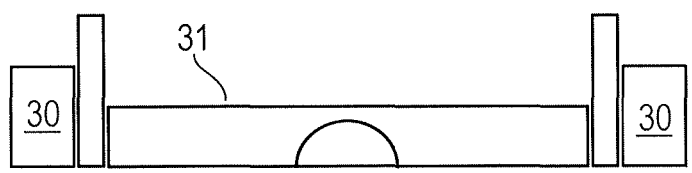
Figure 5B:
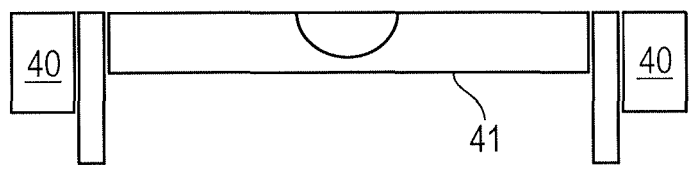
Figure 5B:
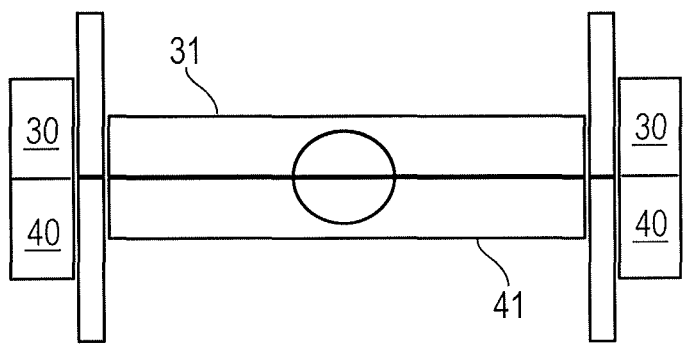
Figure 5C:
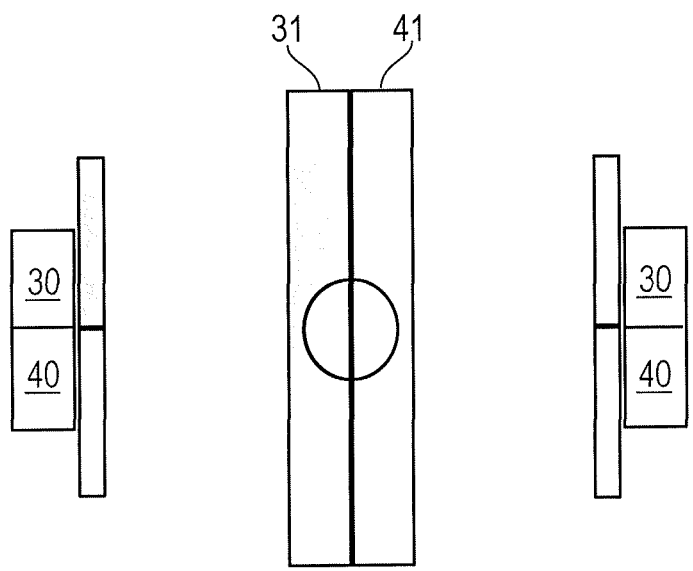
Figure 7:
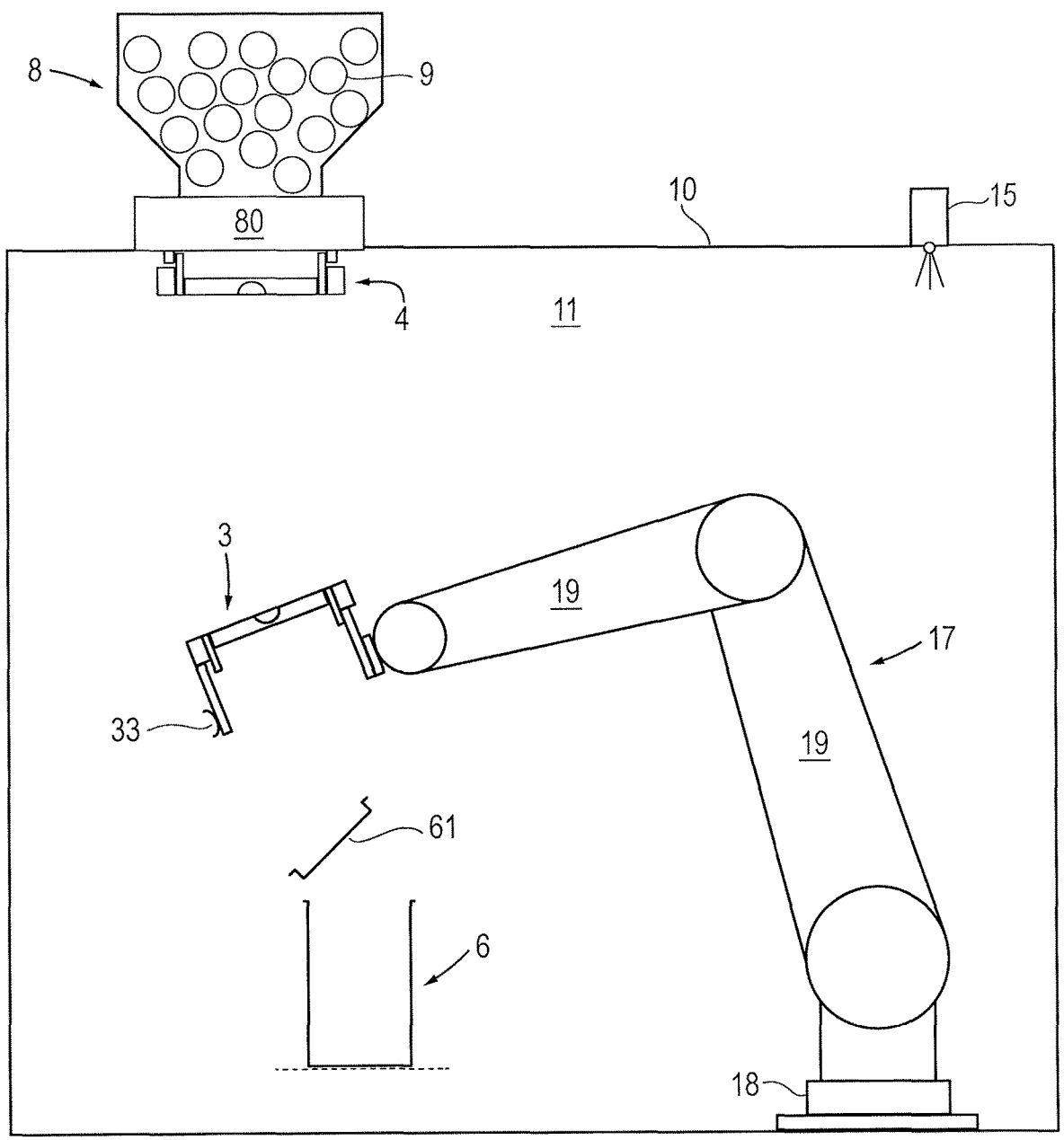
Figure 9A:
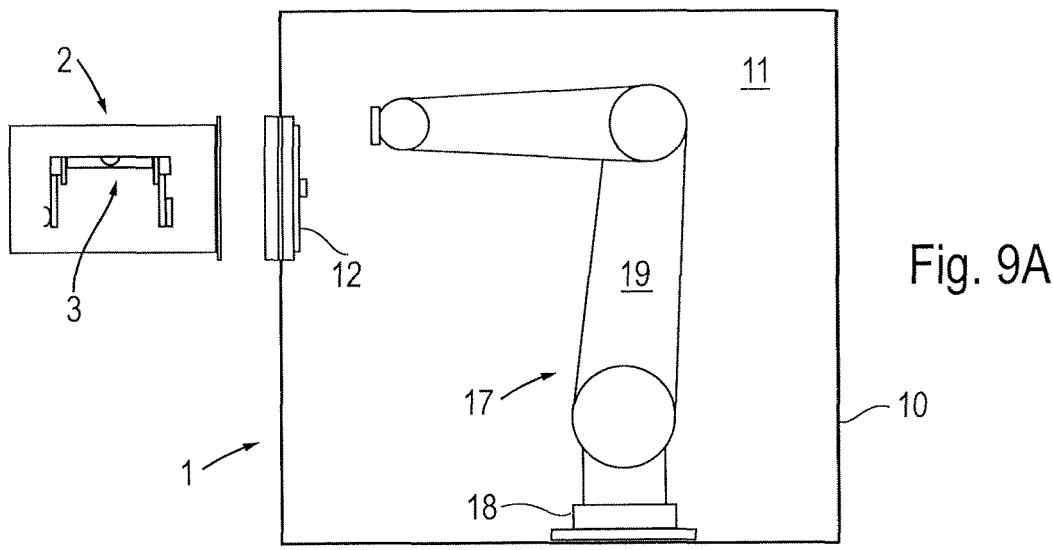
Figure 9B:
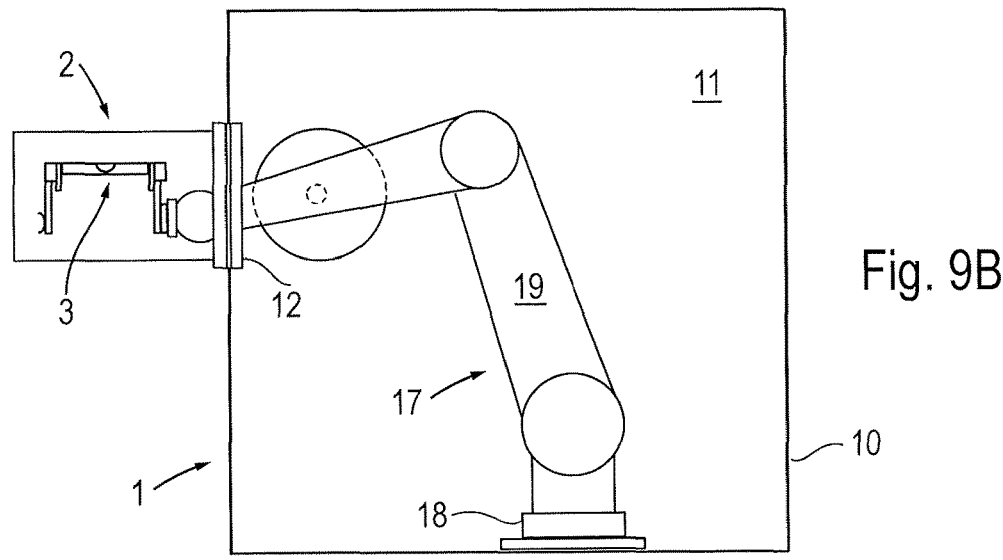
Figure 9C:
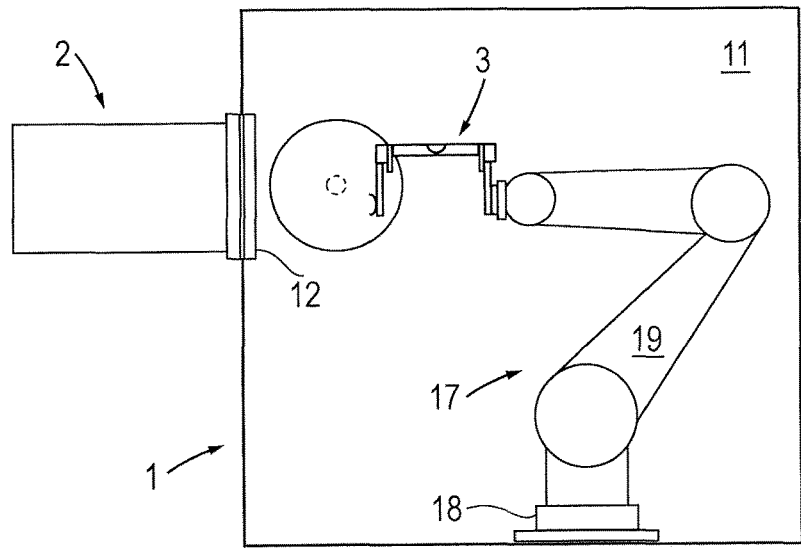
Figure 12B:
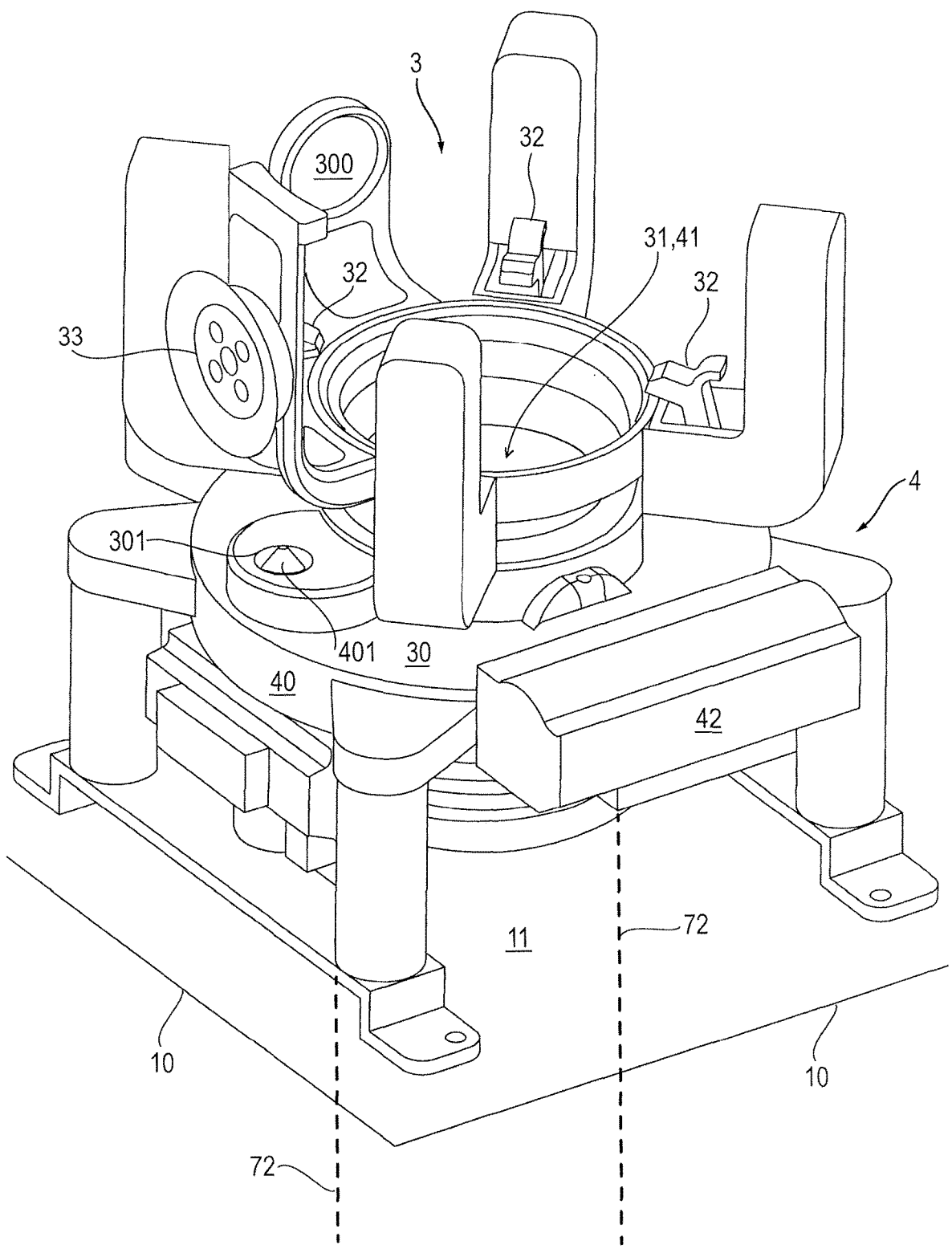
Figure 12C:
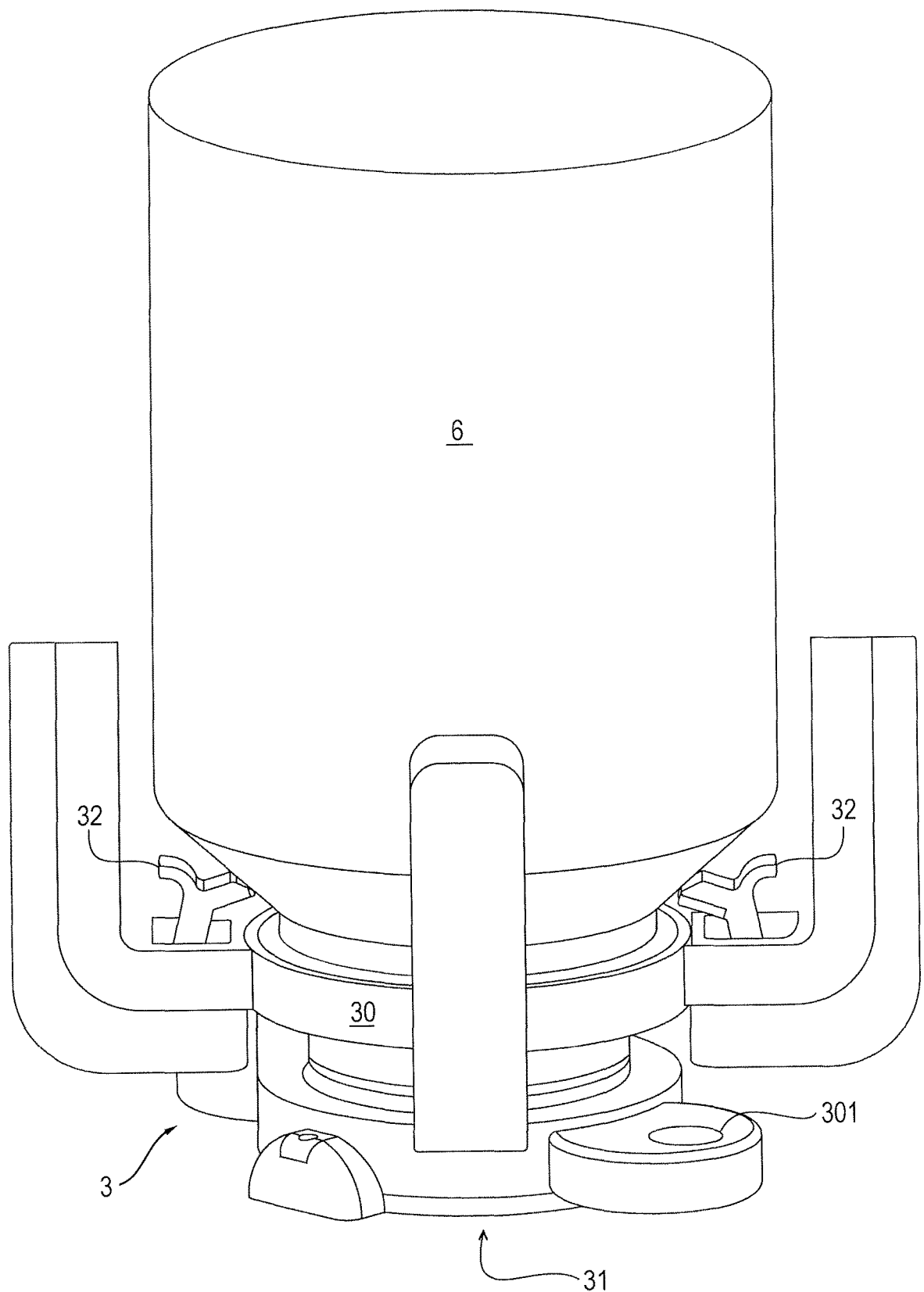
Figure 12D:
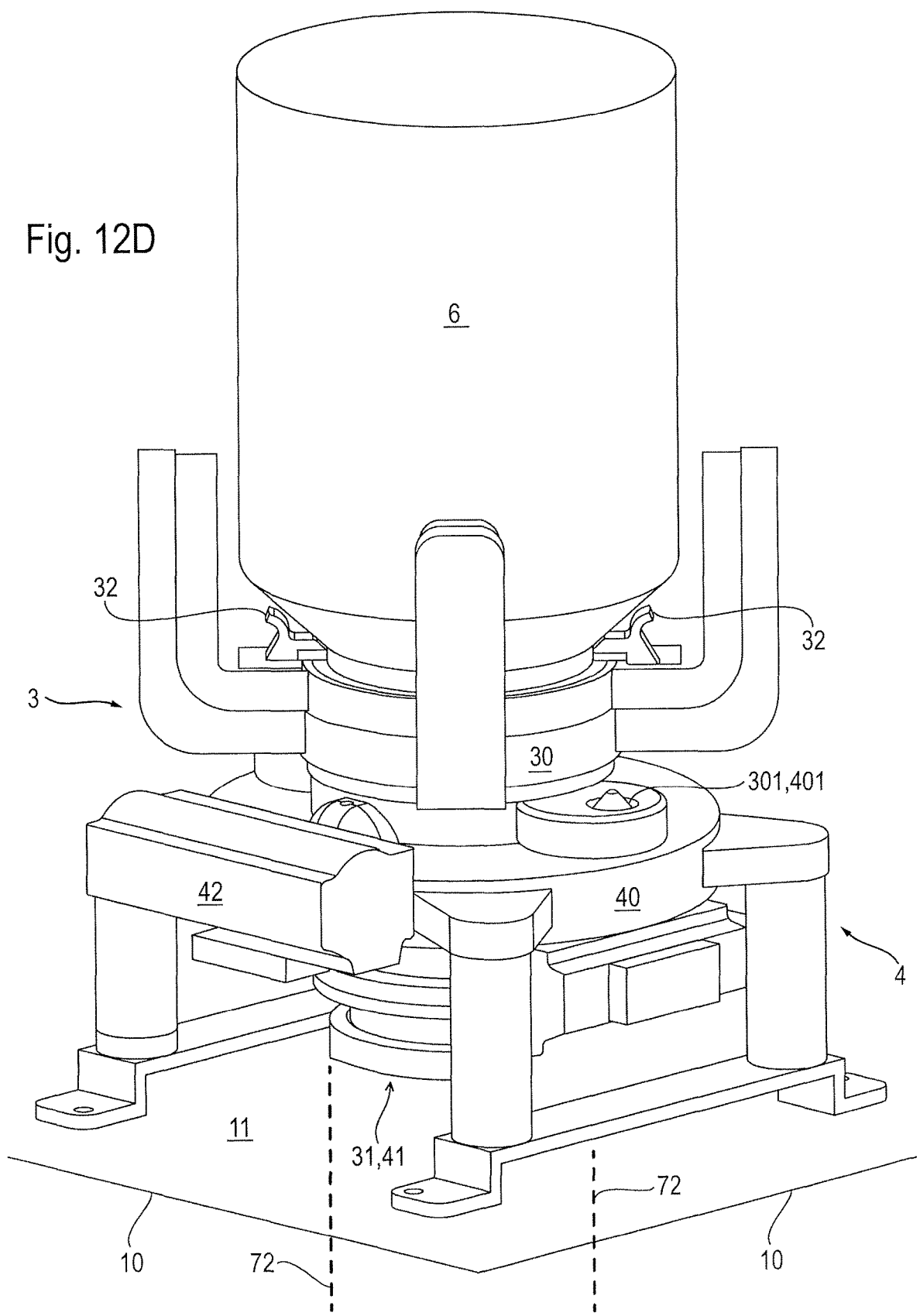

The drawings show:

FIG. 1—the installation according to the invention comprising a containment equipment for the aseptic transfer of a powder, in an overall view;

FIG. 2—the installation according to FIG. 1 in the arrangement for emptying a container with a powder filling into a collection container;

FIG. 3A—a container with the powder filling from FIGS. 1 and 2, enlarged;

FIG. 3B—the collection container to be filled from FIGS. 1 and 2, enlarged;

FIGS. 4A to 4E: the tool carrier from FIGS. 1 and 2 with various equipment;

FIG. 4A—the tool carrier with the permanent basic equipment from FIGS. 1 and 2, in an enlarged front view;

FIG. 4B—the tool carrier according to FIG. 4A with permanently expanded equipment, in an enlarged top view;

FIG. 4C—the tool carrier according to FIG. 4A with the basic equipment and the temporarily attached suction tool;

FIG. 4D—the tool carrier according to FIG. 4A with the basic equipment and the temporarily attached cleaning tool;

FIG. 4E—the tool carrier according to FIG. 4A with the basic equipment and the temporarily attached flanging tool;

FIGS. 5A to 5C: the structure and function of the double flap composed of the tool carrier according to FIG. 4A and the transfer head of the collection container, or the storage container, according to FIG. 1, as schematic representations;

FIG. 5A—the passive part and approached active part of the double flap;

FIG. 5B—the passive part and active part of the double flap according to FIG. 5A, when assembled, in the shut-off position;

FIG. 5C—the double flap according to FIG. 5B, in the open position;

FIGS. 6A to 6Q: a step-by-step transfer process in the emptying of a container with a powder filling into a collection container according to FIG. 2;

FIG. 7—the installation according to FIG. 1 in the arrangement for filling a container with a powder filling from a storage container;

FIGS. 8A to 8L: the step-by-step process in the filling of a container with a powder filling from a storage container according to FIG. 7;

FIGS. 9A to 9C: the step-by-step process in the introduction of a sterile tool carrier according to FIG. 4A into the containment, as schematic representations;

FIGS. 10A to 10G: the step-by-step process in the sterilizing of the tool carrier and collection container, in a first variant, as schematic representations;

FIGS. 11A to 11H: the step-by-step process in the sterilizing of the tool carrier and collection container, in a second variant, as schematic representations;

FIG. 12A—from FIG. 1, the transfer head installed on the floor of the containment and in addition the approached tool carrier, in perspective view;

FIG. 12B—the arrangement according to FIG. 12A, when assembled;

FIG. 12C—the tool carrier from FIG. 12A with a clamped container, as shown in FIG. 6G, upside down; and FIG. 12D—the arrangement according to FIG. 12C, when assembled, with the transfer head from FIG. 12A.

EXEMPLARY EMBODIMENT

The installation according to the invention, comprising a containment for the aseptic transfer of a powder, namely for emptying a container filled with powder into a collection container and/or for filling a container with powder from a storage container, is described in detail in the following with reference to the appended drawings.

The following stipulation applies to the entirety of the description that follows. If reference numbers are included in a figure for the purpose of illustrative clarity and it can be identified unambiguously from the drawing that "recurring" components are involved, but this is not explained in the directly associated descriptive text, then, in the interest of abridgement, reference is made to explanation of these in the preceding descriptions of the figures.

FIGS. 1 and 9A to 9C

The installation illustrated here, comprising a containment 1 for the aseptic transfer of a powder 9, namely according to the suitability of the installation for emptying a container 6 filled with powder 9 into a collection container 7 and/or for filling a container 6 with powder 9 from a storage container 8, is intended to represent an overview of the invention. The containment 1 is surrounded by the housing 10 and thus encloses the working chamber 11, in which a robot 17—in this case realized as an articulated robot—rests on its foundation 18 and comprises the arm arrangement 19. A supply line 15 for introducing decontamination agent, e.g. a spray of an $H_2O_2$ solution, leads into the working chamber 11.

In the working chamber 11 there is currently a container 6 filled with powder 9, which is intended for emptying and which is closed with the first closure element 61—e.g. a lid—and the second closure element 62—usually a flanged cap. This container 6 was introduced in a decontaminated state from a continuous number, by means of the lock 23, through the lock port 13 into the working chamber 11. Alternatively, empty containers 6 to be filled can be continuously conveyed into the working chamber 11 through the lock 23 and the lock port 13.

The lock 23 can also be used for removing empty or filled containers 6 from the working chamber 11, and also for introducing and removing containers 6 filled with powder 9 into and from the working chamber 11 for the purpose of taking a test quantity by means of a sampling tool 39 (see FIGS. 4B, 6F) for checking the characteristics of the powder handled. Alternatively, a second lock or a mousehole may be provided on the containment 1 for removing empty or filled containers 6 from the working chamber 11, and also for introducing and removing of containers 6 filled with powder 9 into and from the working chamber 11 for the purpose of taking a test quantity, by means of the sampling tool 39, for checking the characteristics of the powder 9 handled.

The collection container 7 is designed to receive the powder 9 from emptied containers 6, and has an inlet, which leads in out of the working chamber 11, on which there is seated a transfer head 4 that projects into the working chamber 11. The channel piece 72, which projects through the housing 10, extends from the transfer head 4 to the collection container 7. The storage container 8 filled with powder 9 is designed for charging empty containers 6 and has an inlet, leading off into the working chamber 11, on which there is likewise seated a transfer head 4 projecting into the working chamber 11. The dosing device 80, for apportioning the required filling quantity of powder 9, is arranged between the storage container 8 and the transfer head 4. The transfer head 4 belonging to the collection container 7 is anchored to the housing 10 of the containment 1, preferably to a floor element, and the transfer head 4 belonging to the storage container 8 is also anchored to the housing 10 of the containment 1, preferably to a ceiling element. The collection container 7 rests on the foundation 70 and comprises the outlet valve 71 for discharging pressure and fluid in the process of cleaning and decontamination by means of the rinsing and sterilization tool 35.

A suction tool 34, a rinsing and sterilization tool 35 and a flanging tool 36 are detachably deposited inside the working chamber 11 at a parking station 14 to be used for access with the tool carrier 3 to be installed on the arm arrangement 19 of the robot 17. The suction tool 34 is used to clean the tool carrier 3 and first closure elements 61 inside the working chamber 11 (see FIG. 4C). The rinsing and sterilization tool 35 is used to clean and sterilize the collection container 7, including the passive part 31 and the active part 41 of the double flap (see FIGS. 10A-10G), inside the working chamber 11. The flanging tool 36 is used to apply second closure elements 62 to the container 6 inside the working chamber 11.

The hermetically encased transfer container 2 is provided for introducing the tool carrier 3 into the working chamber 11 in a sterile condition, and the housing 10 comprises the transfer port 12. The transfer container 2 is designed to receive the tool carrier 3 and to dock onto the transfer port 12. When the transfer container 2 has been docked onto the transfer port 12, with the transfer port 12 and transfer container open 2, the tool carrier 3 can be pulled out of the transfer container 2 and into the working chamber 11 by the accessing robot 17.

FIG. 2

Here, the installation according to FIG. 1 is reduced to the function of emptying a container 6 fully filled with powder 9 into a collection container 7 that receives the powder 9 to be emptied. The arm arrangement 19 of the robot 17 is connected to a tool carrier 3.

FIGS. 3A and 3B

A container 6 to be emptied contains the powder 9 and is provided with at least the first closure element 61, possibly also with the second closure element 62 attached above it. A filled container 6, on the other hand, will usually only be closed with the first closure element 61. Installed on the inlet of the collection container 7 there is a transfer head 4 that comprises the base 40 and the active part 41 of the double flap, which is adjustable by the drive 42.

FIGS. 4A to 4E

This sequence of figures illustrates the tool carrier 3 with various equipment. The tool carrier 3 has at its base at least the clamping elements 32 for gripping the container 6, a vacuum lifter 33 for gripping the first closure element 61, and the passive part 31 of the double flap. For connection to the arm arrangement 19, the base 30 of the tool carrier 3 has a connecting flange 300, and a load cell 302 can be seated in the connecting flange 300. The base 30 has positioning members 301 designed for positive and force-fitting connection to complementary locking members 401 that are located on a base 40 of the transfer head 4 and ensure pressure-tight assembly between the tool carrier 3 and the transfer head (see FIGS. 12A-12D).

The base 30 of the tool carrier is equipped to temporarily receive a suction tool 34 or a rinsing and sterilization tool 35 or a flanging tool 36. The clamping elements 32 are used alone or additionally to fix the tools 34,35,36 to the base 30 of the tool carrier 3. The lines 340 lead into the suction tool 34, and the line 350 leads into the rinsing and sterilization tool 35.

The tool carrier 3 when fully equipped also comprises the following:
- a vibrator 37 for detaching a residue of powder 9 from a container 6 to be emptied;
- a severing hook 38 for removing any possible second closure element 62 present on a container 6 to be emptied; and
- a sampling tool 39 for taking a sample from the powder 9 for checking purposes.

FIGS. 5A to 5C

This sequence of figures illustrates the structure and function of the double flap, which is composed of the passive part 31 of the tool carrier 3 and the active part 41 of the transfer head 4. The passive part 31 and active part 41 are integrated, respectively, in the base 30 of the tool carrier 3 and in the base 40 of the transfer head 4. The passive part 31 and active part 41 are moved together by the drive 42 on the transfer head 4 from the closed position to the open position and vice versa.

FIGS. 6A to 6Q

This sequence of figures shows a step-by-step transfer process in the emptying of a container 6 filled with powder 9 into a collection container 7.

FIG. 6A: The second closure element 62 is gripped and removed from the container 6 filled with powder 9, by the mandrel-like severing hook 38 on the tool carrier 3.

FIG. 6B: The first closure element 61 is gripped by the vacuum lifter 33 present on the tool carrier 3.

FIG. 6C: The first closure element 61 is removed by the vacuum lifter 33 present on the tool carrier 3.

FIG. 6D: Any remaining adhering powder 9 is removed by suction from the first closure element 61 by an additional suction tool 34'.

FIG. 6E: A sample of the powder 9 is taken by the sampling tool 39 provided on the tool carrier 3.

FIG. 6F: The sample of powder 9 taken is placed in a sample vessel 90 for checking.

FIG. 6G: The tool carrier 3 is placed on the container 6.

FIG. 6H: The total weight is determined by means of the load cell 302 in the connecting flange 300.

FIG. 6I: To empty the container 6, it is connected upside down to the transfer head 4 on the collection container 7.

FIG. 6J: The double flap 31,41 is moved to the open position by a drive 42, and the powder 9 flows through the channel piece 72 into the collection container 7.

Figure 6L:
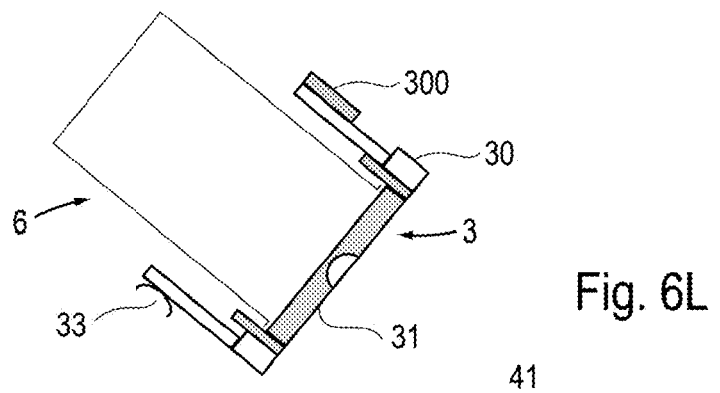
Figure 6K:
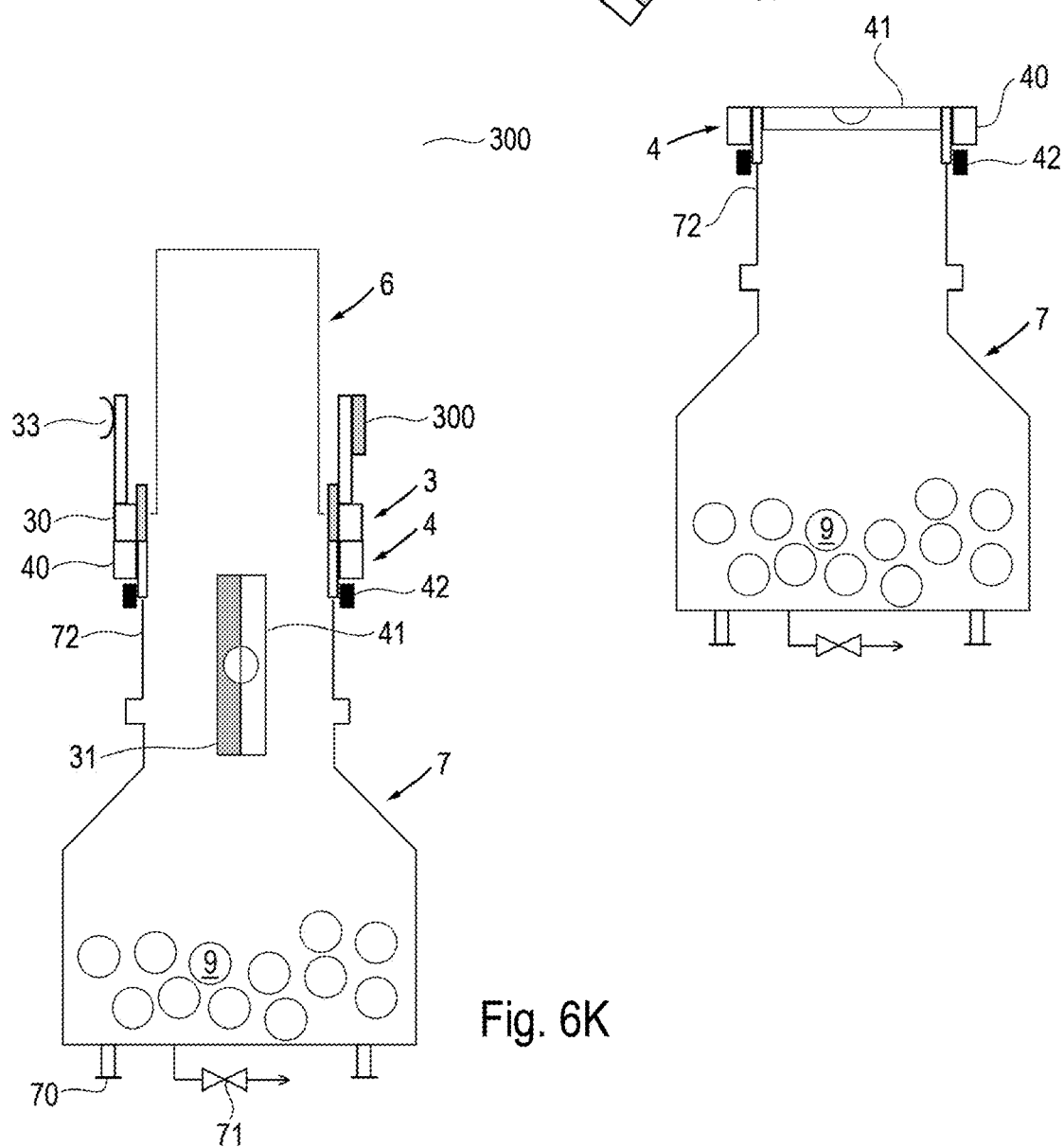

FIG. 6K: Emptying is complete; the container 6 is empty, all powder 9 has flowed into the collection container 7. Any powder 9 remaining in the container 6 is detached by activation of the vibrator 7 (see FIG. 4B).

FIG. 6L: The empty container 6 with the tool carrier 3 are separated from the transfer head 4 of the collection container 7.

FIG. 6M: The tool carrier 3 is placed on the empty container 6. The empty weight is determined by means of the load cell 302 in the connecting flange 300.

FIG. 6N: The tool carrier 3, in particular the inside of the passive part 31 of the double flap, is cleaned by the suction tool 34 inserted into the tool carrier 3.

FIG. 6O: The tool carrier 3, by means of its vacuum lifter 33, grips a first closure element 61.

FIG. 6P: The first closure element 61 is place on the empty container 6.

FIG. 6Q: The emptying process is complete; an empty container 6 closed with a first closure element 61 is ready for removal.

FIG. 7

Here the installation according to FIG. 1 is reduced to the function of filling an empty container 6 with powder 9 from the storage container 8. The container 6 is shown open; the first closure element 61 has been lifted off.

FIGS. 8A to 8L

This sequence of figures shows a step-by-step transfer process in the filling of an empty container 6 with powder 9 from a storage container 8.

FIG. 8A: The first closure element 61 of the empty container 6 is gripped by the vacuum lifter 33 present on the tool carrier 3.

FIG. 8B: The first closure element 61 has been lifted off.

FIG. 8C: The tool carrier 3 is placed on the open container 6 and the empty weight is determined by means of the load cell 302 in the connecting flange 300.

FIG. 8D: Container 6 with a tool carrier 3 on top are approached to the transfer head 4 of the storage container 8.

Figure 8E:
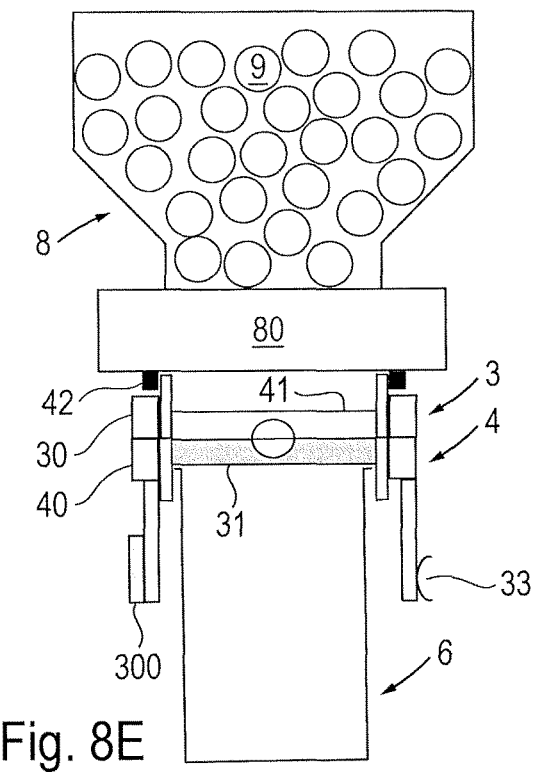

FIG. 8E: Container 6 with a tool carrier 3 on top are docked to the transfer head 4 of the storage container 8.

Figure 8F:
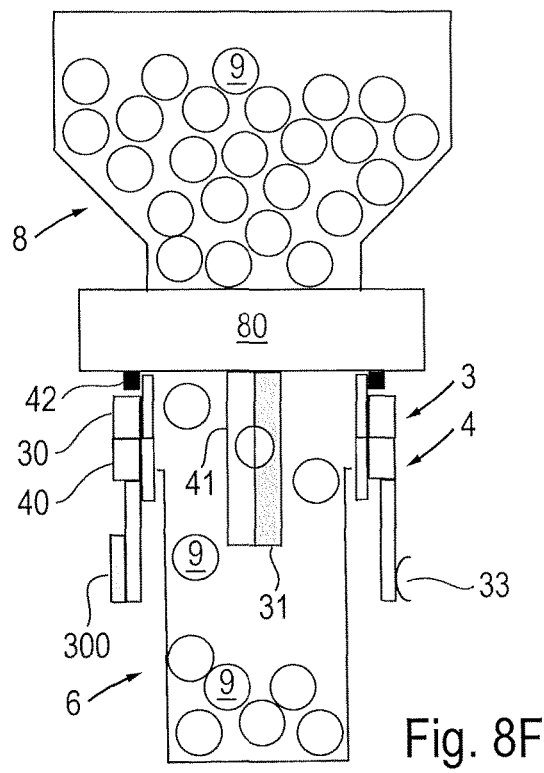

FIG. 8F: The double flap 31,41 is moved to the open position by a drive 42, the powder 9 flows out of the dosing device 80 and into the container 6.

Figure 8G:
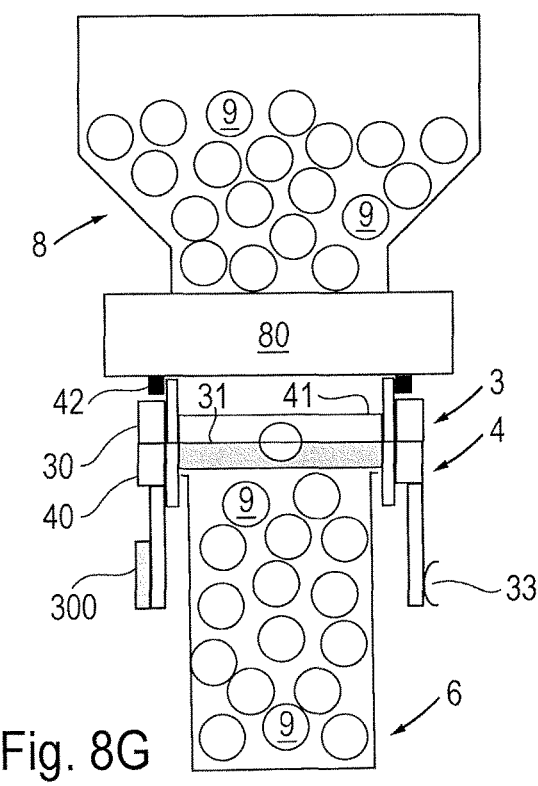

FIG. 8G: The container 6 has been filled; the double flap 31,41 is moved by the drive 42 into the closed position.

Figure 8H:
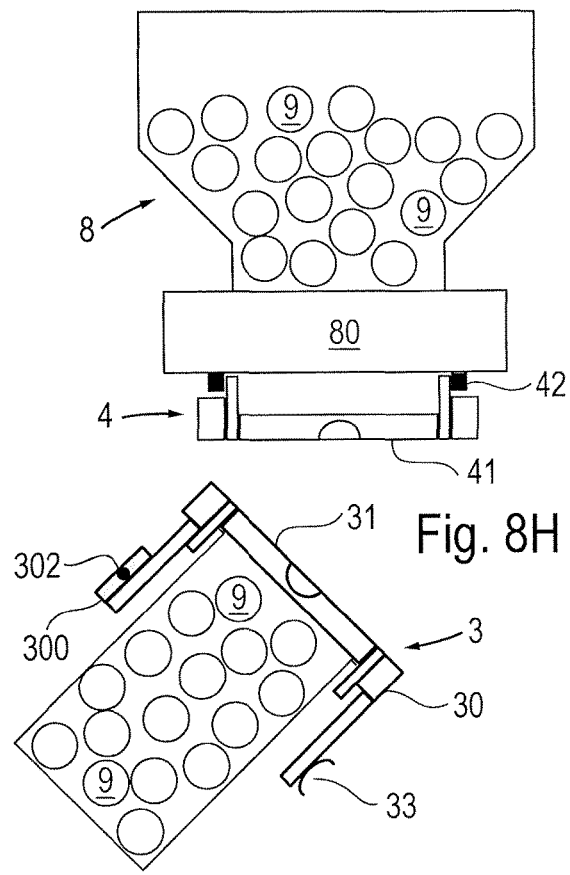

FIG. 8H: The filled container 6 with the transfer head 4 on top is undocked from the transfer head 4 at the storage container 8. The total weight is determined by means of the load cell 302 in the connecting flange 300.

Figure 8I:
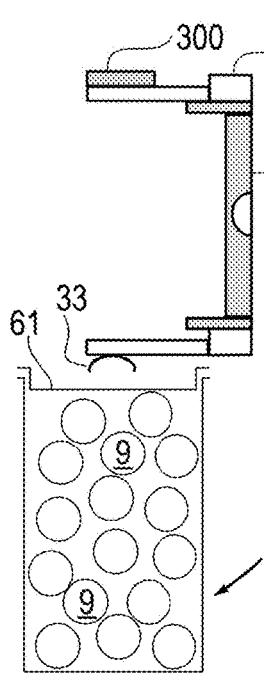

FIG. 8I: The first closure element 61 is gripped by the vacuum lifter 33 present on the tool carrier 3 and placed on the filled container 6.

Figure 8J:
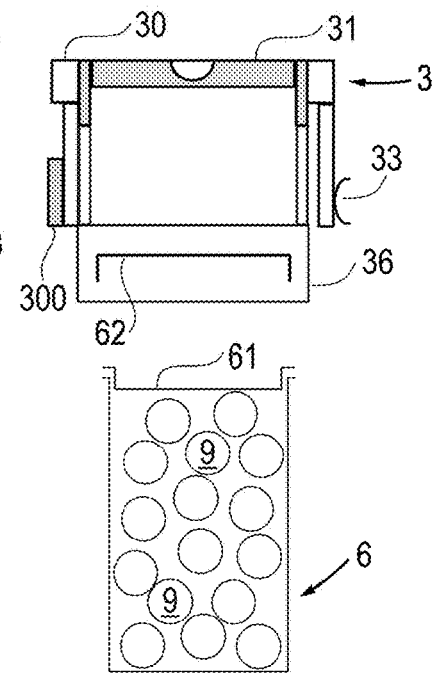

FIG. 8J: The second closure element 62 is provided by the flanging tool 36 docked on the tool carrier 3.

Figure 8K:
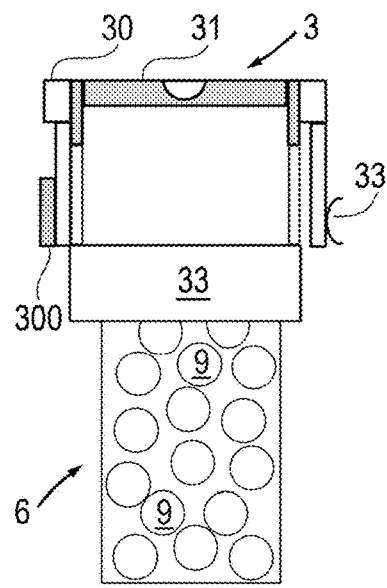

FIG. 8K: The flanging tool 36 is placed on the filled container 6.

Figure 8L:
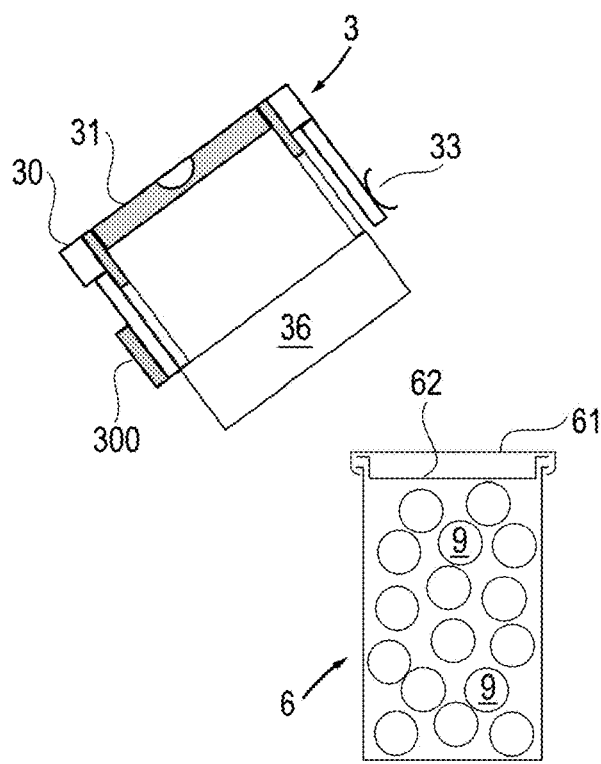

FIG. 8L: The second closure element 62 has been attached to the filled container 6 over the first closure element 61. The filling process is complete; the securely closed container 6 is ready for removal.

FIGS. 10A to 10G

This sequence of figures shows the step-by-step process in the sterilizing of the tool carrier 3 and collection container 7, in a first variant.

FIG. 10A: The rinsing and sterilization tool 35 is gripped by the tool carrier 3.

FIG. 10B: The arrangement of tool carrier 3 and rinsing and sterilization tool 35 is approached to the transfer head 4 of the collection container 7.

FIG. 10C: The tool carrier 3 is connected to the transfer head 4 of the collection container 7; the double flap 31,41 is in the closed position.

Figure 10D:
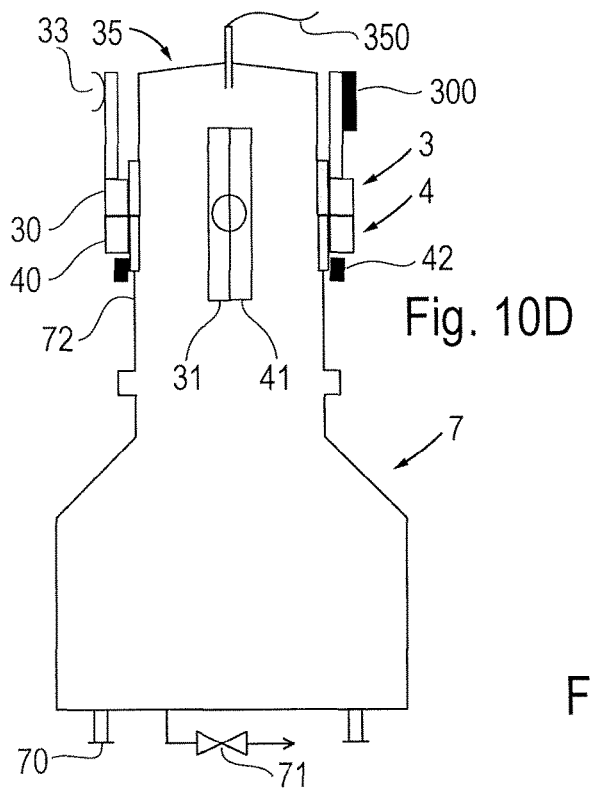

FIG. 10D: The double flap 31,41 is opened, and the double flap 31,41 and collection container 7 are rinsed and sterilized.

Figure 10E:
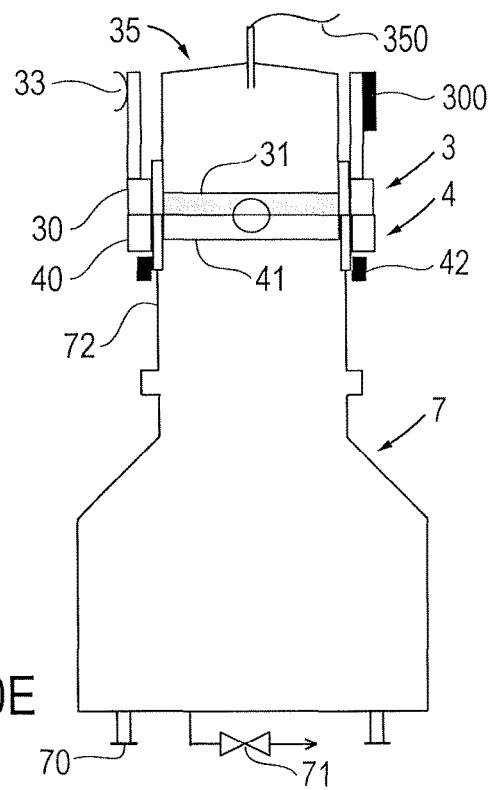

FIG. 10E: Rinsing and sterilizing are finished, the double flap 31,41 is closed.

Figure 10F:
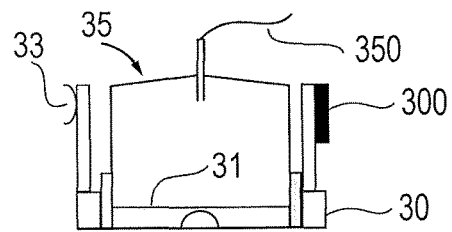
Figure 10F:
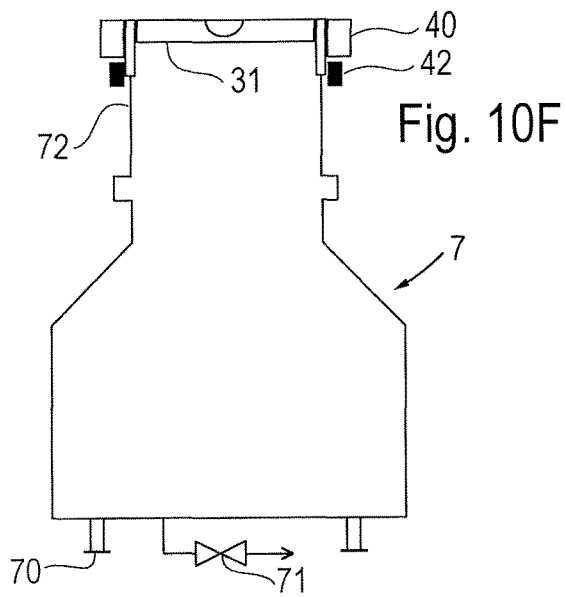

FIG. 10F: The tool carrier 3 with the rinsing and sterilization tool 35 is lifted off the transfer head 4 of the collection container 7.

Figure 10G:
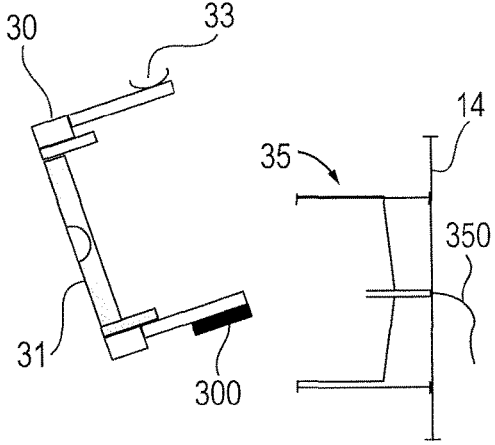

FIG. 10G: The rinsing and sterilization tool 35 hanging on the tool carrier 3 is returned to the parking station 14.

Figure 11A:
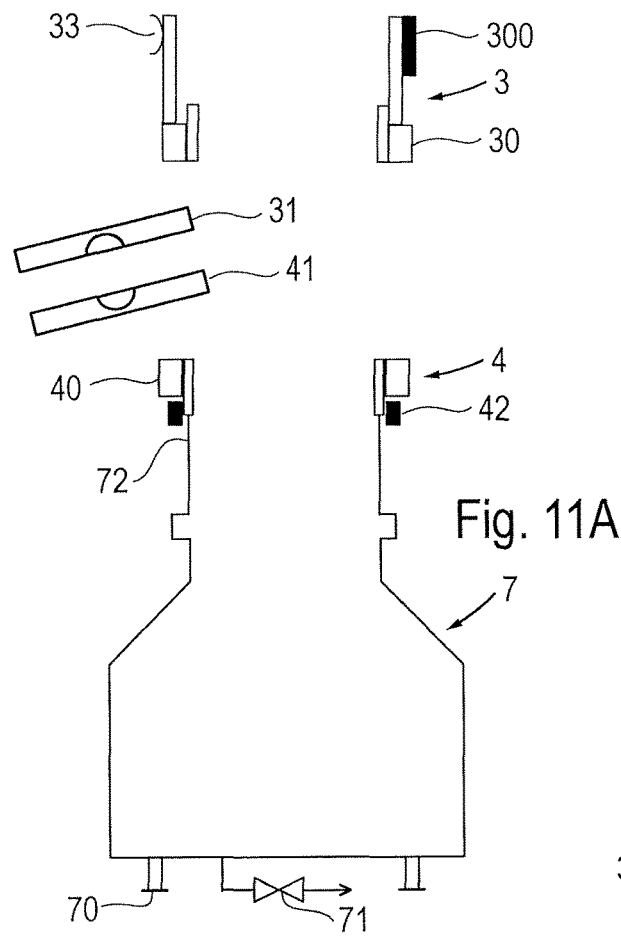
Figure 11B:
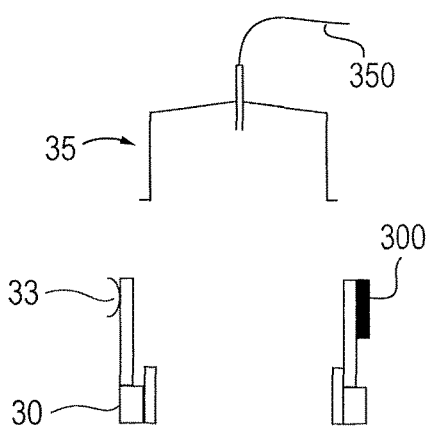
Figure 11C:
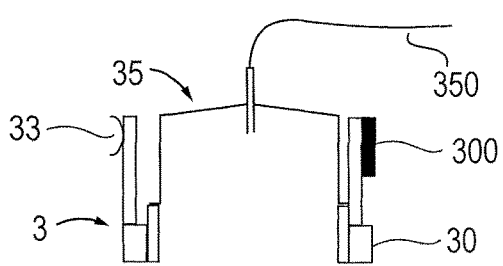
Figure 11C:
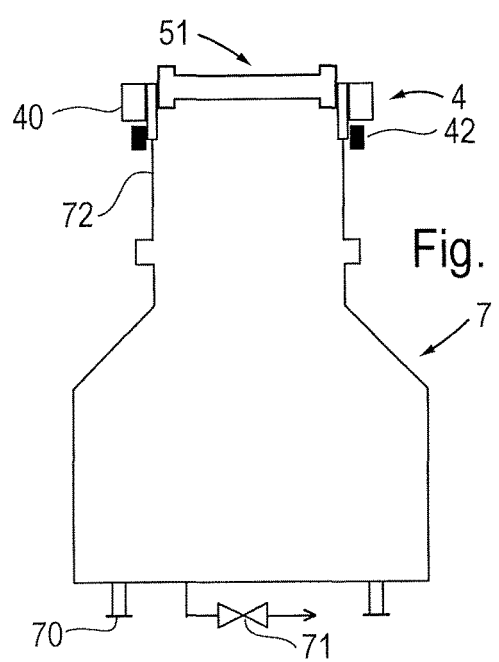
Figure 11D:
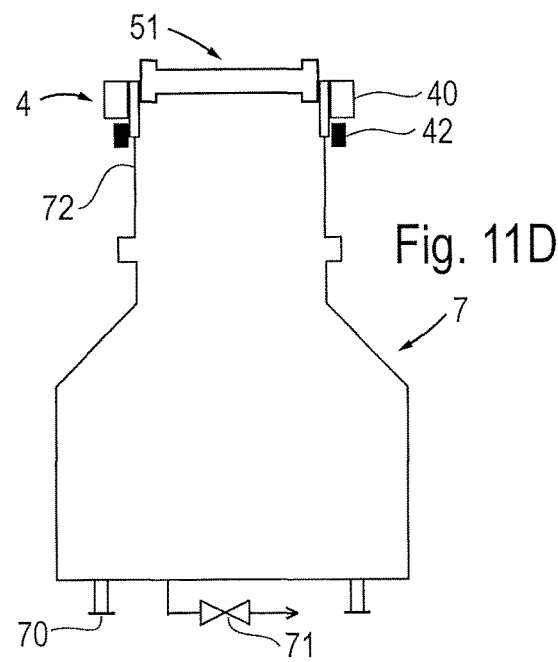
Figure 11E:
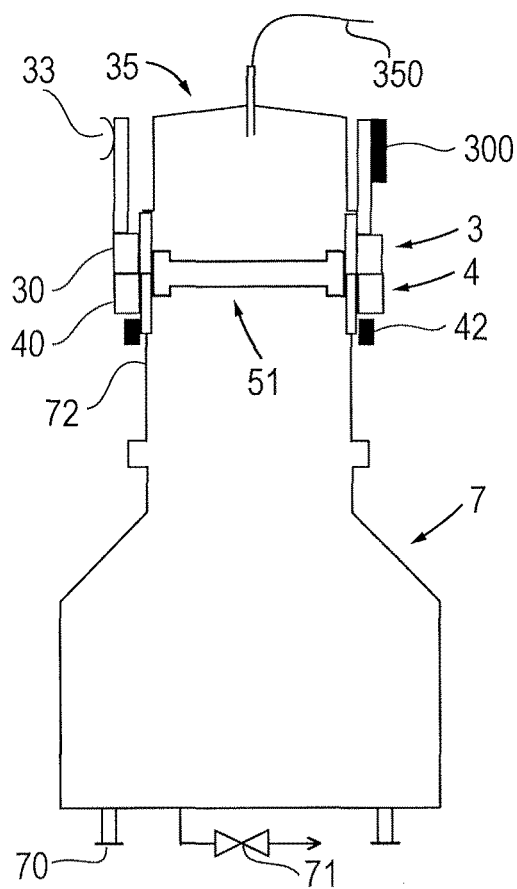
Figure 11F:
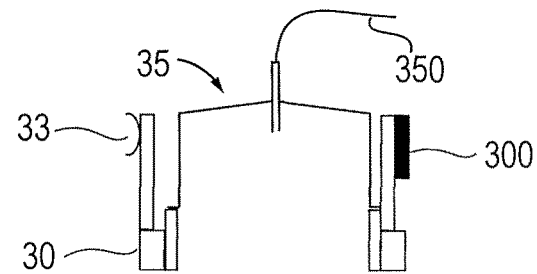
Figure 11F:
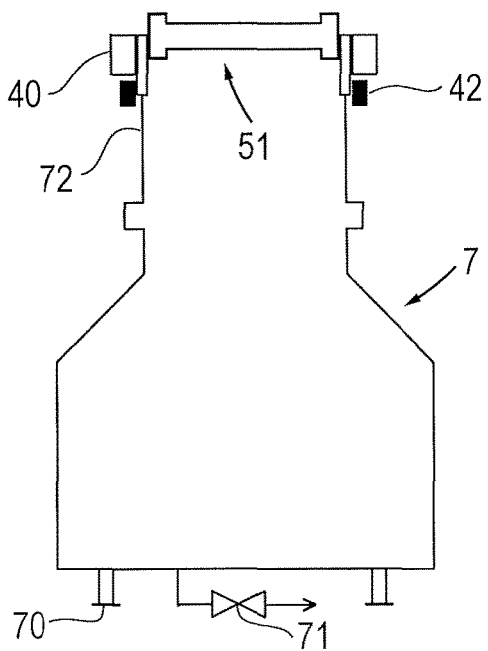
Figure 11G:
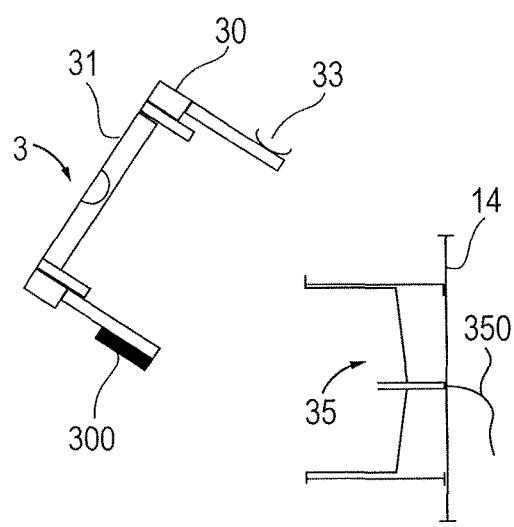
Figure 11G:
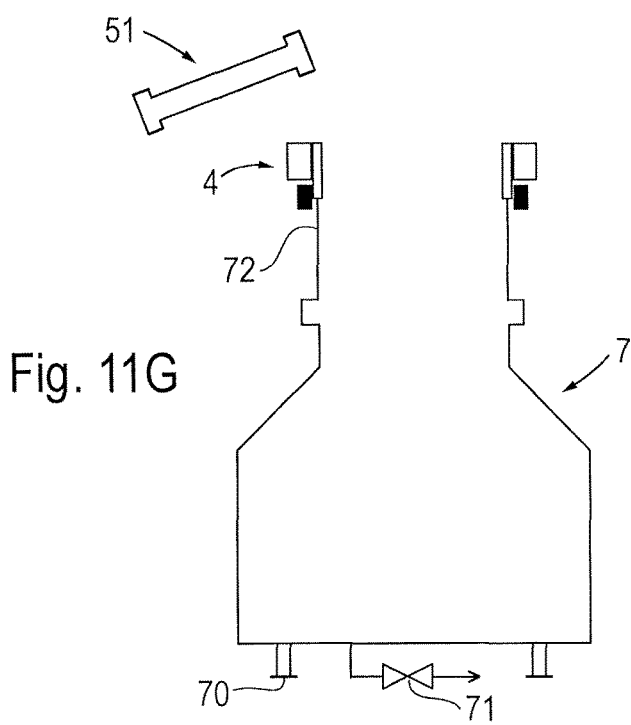
Figure 11H:
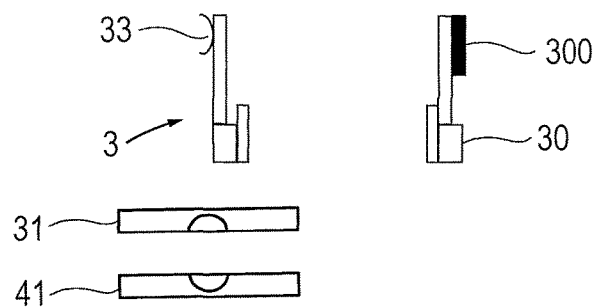
Figure 11H:
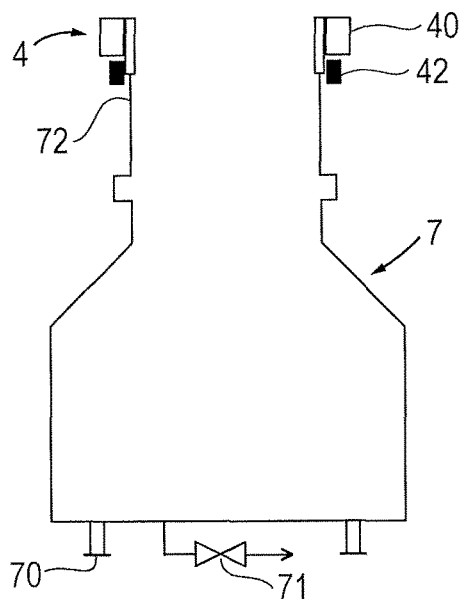

FIGS. 11A to 11 H

This sequence of figures shows the step-by-step process in the sterilizing of the tool carrier 3 and collection container 7, in a second variant. Again, the rinsing and sterilization tool 35 is used with the tool carrier 3, but now the two parts 31,41 of the double flap, have to be removed and replaced by a pseudo part 51.

FIGS. 12A and 12B

The transfer head 4 has been installed on the housing 10 of the containment 1, preferably on the floor, and the tool carrier 3 is approached from above. The positioning members 301 on the tool carrier 3 are aligned with the locking members 401 for the purpose of joining. A channel piece 72 extends from the output of the transfer head 4 out of the containment 1 and into the collection container 7 (see FIG. 1). When the tool carrier 3 and transfer head 7 are assembled, the positioning members 301 are firmly locked to the locking members 401, so that the tool carrier 3 and transfer head 4 are connected to each other in a pressure-tight manner.

FIGS. 12C and 12D

When the upside-down container 6 is being placed on, or lifted off from, the tool carrier 3, the clamping elements 32 of the tool carrier 3 are in the released position (see FIG. 12C), whereas during the transfer process they are in the clamping position (see FIG. 12D).

The invention claimed is:

1. An installation comprising a containment for the aseptic transfer of a powder, for emptying a container filled with powder into a collection container and for filling a container with powder from a storage container, wherein:
   a) the containment has a working chamber surrounded by a housing;

b) installed in the containment there is a robot, which has an arm arrangement that is movable over a swivel range;
c) the collection container having an inlet that leads in out of the working chamber, and the storage container having an outlet that leads off into the working chamber; and
d) the container can be closed at least by means of a first closure element, wherein
e) the arm arrangement is connected to a tool carrier, which is equipped at the its base of the tool carrier with at least clamping elements for gripping the container, a vacuum lifter for gripping the first closure element, and a passive part of a double flap;
f) mounted at the inlet into the collection container and/or at the outlet of the storage container there is a transfer head, each of which projects into the working chamber; and
g) the passive part, together with an active part contained in the transfer head, forms the double flap.

2. The installation as claimed in claim 1, wherein:
a) the base of the tool carrier has a connecting flange for connection to the arm arrangement, wherein a load cell is seated in the connecting flange; and
b) the base has positioning members, for positive and force-fitting connection to complementary locking members located on a base of the transfer head and which ensure pressure-tight assembly between the tool carrier and the transfer head.

3. The installation as claimed in claim 2, wherein the load cell seated in the connecting flange is used for comparative weight determination, for-namely:
a) emptying a container filled with powder into the collection container between the container that, in the initial situation, is filled with powder and the emptied container; or
b) filling an empty container with powder from the storage container, between the container that, in the initial situation, is empty and the container filled with powder.

4. The installation as claimed in claim 1, wherein:
a) the base of the tool carrier is equipped to temporarily receive a suction tool or a rinsing and sterilization tool or a flanging tool;
b) the clamping elements are used alone or additionally to fix the tools to the base of the tool carrier;
c) the suction tool is used inside the working chamber to clean the tool carrier and first closure elements;
d) the rinsing and sterilization tool is used inside the working chamber to clean and sterilize the collection container, including the passive part and the active part of the double flap; and
e) the flanging tool is used inside the working chamber to apply a second closure element to the container.

5. The installation as claimed in claim 4, wherein the tools are detachably deposited, inside the working chamber, at a parking station to be used for access with the tool carrier installed on the arm arrangement of the robot.

6. The installation as claimed in claim 1, wherein the tool carrier, when fully equipped, also comprises:
a) a vibrator for detaching a residue of powder from a container to be emptied;
b) a severing hook for removing any second closure element present on a container to be emptied; and
c) a sampling tool for taking a sample from the powder for checking purposes.

7. The installation as claimed in claim 6, wherein:
the sampling tool provided for taking a sample of powder for checking purposes is used for emptying a container filled with powder into the collection container and for filling an empty container with powder from the storage container.

8. The installation as claimed in claim 6, wherein the installation is used exclusively for checking the handled powder by use of the sampling tool.

9. The installation as claimed in claim 1, wherein:
a) the first closure element comprises a lid placed on the mouth of the container; and
b) a second closure element comprises a flanged cap attached to the container over the first closure element.

10. The installation as claimed in claim 1, wherein:
a) a hermetically encased transfer container is provided for introducing the tool carrier into the working chamber in a sterile condition, and the housing has a transfer port;
b) the transfer container configured to receive the tool carrier and to dock onto the transfer port; and
c) when the transfer container has been docked onto the transfer port, with the transfer port and transfer container open, the tool carrier can be pulled out of the transfer container and into the working chamber by the accessing robot.

11. The installation as claimed in claim 1, wherein:
a) a hermetically encased lock is provided, and the housing has a lock port, for introducing into the working chamber, in a decontaminated condition, containers that are to be emptied or filled;
b) the lock configured to receive containers and to dock onto the lock port; and
c) when the lock has been docked onto the lock port, with the lock port and lock open, the containers can be pulled out of the lock and into the working chamber by the accessing robot or can enter the working chamber by means of a conveyor.

12. The installation as claimed in claim 11, wherein:
the lock can also be used for removing empty or filled containers from the working chamber, and also for introducing and removing containers filled with powder into and from the working chamber for taking a sample quantity, by means of a sampling tool, for checking the characteristics of the powder handled.

13. The installation as claimed in claim 11, wherein a second lock for removing empty or filled containers from the working chamber, and also for introducing and removing containers filled with powder into and from the working chamber for the purpose of taking a test quantity, by means of a sampling tool, for checking the characteristics of the powder handled.

14. The installation as claimed in claim 1, further comprising a dosing device, arranged between the storage container and the transfer head, for apportioning the required filling quantity of powder.

15. The installation as claimed in claim 1, wherein:
a) the transfer head belonging to the collection container is anchored to the housing of the containment, and a channel piece extends from the transfer head to the collection container; and
b) the transfer head belonging to the storage container is anchored to the housing of the containment.

16. The installation as claimed in claim 15 wherein the collection container is anchored to a floor element of the housing, and the transfer head belonging to the storage container is anchored to a ceiling element of the housing.

17. The installation as claimed in claim 1, wherein:
a) the first closure element comprises a plug inserted into the mouth of the container; and
b) a second closure element comprises a flanged cap attached to the container over the first closure element.

* * * * *